(12) United States Patent
Takano

(10) Patent No.: US 11,337,081 B2
(45) Date of Patent: May 17, 2022

(54) WIRELESS COMMUNICATION APPARATUS AND COMMUNICATION CONTROL METHOD

(71) Applicant: Sony Corporation, Tokyo (JP)

(72) Inventor: Hiroaki Takano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/257,019

(22) PCT Filed: Jul. 10, 2019

(86) PCT No.: PCT/JP2019/027351
§ 371 (c)(1),
(2) Date: Dec. 30, 2020

(87) PCT Pub. No.: WO2020/031602
PCT Pub. Date: Feb. 13, 2020

(65) Prior Publication Data
US 2021/0282027 A1    Sep. 9, 2021

(30) Foreign Application Priority Data

Aug. 10, 2018 (JP) .............................. JP2018-151269

(51) Int. Cl.
*H04W 16/28* (2009.01)
*H04W 88/08* (2009.01)

(52) U.S. Cl.
CPC ............ *H04W 16/28* (2013.01); *H04W 88/08* (2013.01)

(58) Field of Classification Search
CPC ..... H04W 16/28; H04W 88/08; H04W 28/10; H04W 88/085; H04B 7/10; H04B 7/0413; H01Q 21/061; H01Q 21/08; H01Q 21/24
See application file for complete search history.

(56) References Cited

U.S. PATENT DOCUMENTS

| | | | |
|---|---|---|---|
| 11,096,088 B2* | 8/2021 | Estella Aguerri | H04W 28/06 |
| 2007/0091896 A1 | 4/2007 | Liu | |
| 2012/0243468 A1 | 9/2012 | Hui et al. | |
| 2016/0128023 A1* | 5/2016 | Gustavsson | H04B 7/0413 |
| | | | 370/329 |
| 2017/0094531 A1 | 3/2017 | Kakishima et al. | |
| 2018/0027569 A1 | 1/2018 | Du et al. | |
| 2018/0042034 A1 | 2/2018 | Miyatani | |

(Continued)

FOREIGN PATENT DOCUMENTS

| | | |
|---|---|---|
| JP | 2007-124608 A | 5/2007 |
| JP | 2014-513461 A | 5/2014 |

(Continued)

OTHER PUBLICATIONS

International Search Report and Written Opinion dated Sep. 10, 2019, received for PCT Application No. PCT/JP2019/027351, Filed on Jul. 10, 2019, 9 pages including English Translation.

(Continued)

*Primary Examiner* — Kenneth T Lam
(74) *Attorney, Agent, or Firm* — Xsensus LLP

(57) ABSTRACT

Provided is a wireless communication apparatus (100) including two-dimensionally-arrayed antenna elements (110), and an arrangement unit (140) configured to arrange IQ data of signals output from the antenna elements, for each time in a state in which an array of the antenna elements is maintained.

16 Claims, 24 Drawing Sheets

(56) References Cited

U.S. PATENT DOCUMENTS

| | | | |
|---|---|---|---|
| 2018/0176898 A1* | 6/2018 | Yu | H04W 88/085 |
| 2019/0165908 A1 | 5/2019 | Takeda et al. | |
| 2019/0319765 A1* | 10/2019 | El Mghazli | H04B 7/0413 |
| 2020/0137835 A1* | 4/2020 | Estella Aguerri | |
| | | | H04W 72/0453 |
| 2020/0228232 A1* | 7/2020 | Lyashev | H04B 7/0417 |
| 2021/0050884 A1* | 2/2021 | Lu | H04B 7/024 |

FOREIGN PATENT DOCUMENTS

| | | |
|---|---|---|
| JP | 2015-185952 A | 10/2015 |
| JP | 2017-204714 A | 11/2017 |
| JP | 2018-14697 A | 1/2018 |
| JP | 2018-23035 A | 2/2018 |

OTHER PUBLICATIONS

Matsunaga, "Radio Access Network Architecture Evolution toward 5G", IEICE Technical Report, Cloud System Research Laboratories, vol. 114, No. 254, Oct. 9, 2014, pp. 89-94.

\* cited by examiner

FIG. 8

| D(0,0) | D(0,1) | D(0,2) | D(0,3) |
|---|---|---|---|
| D(1,0) | D(1,1) | D(1,2) | D(1,3) |
| D(2,0) | D(2,1) | D(2,2) | D(2,3) |
| D(3,0) | D(3,1) | D(3,2) | D(3,3) |

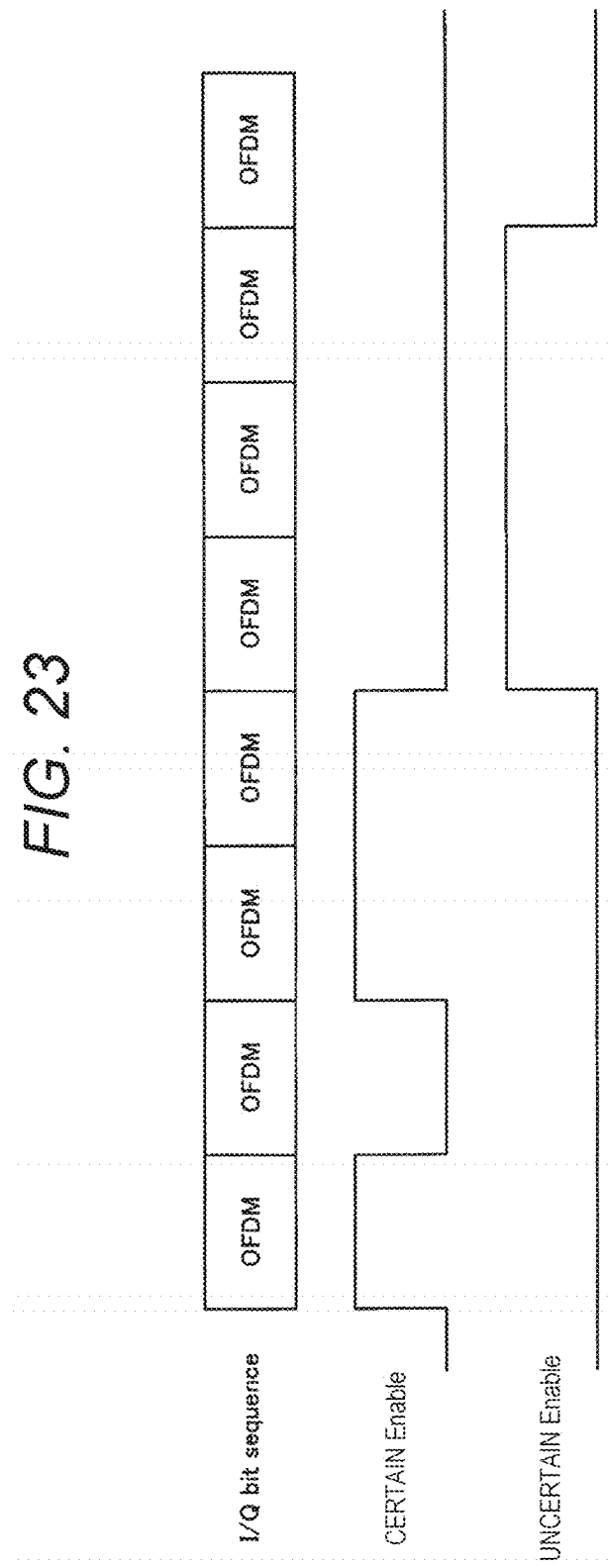

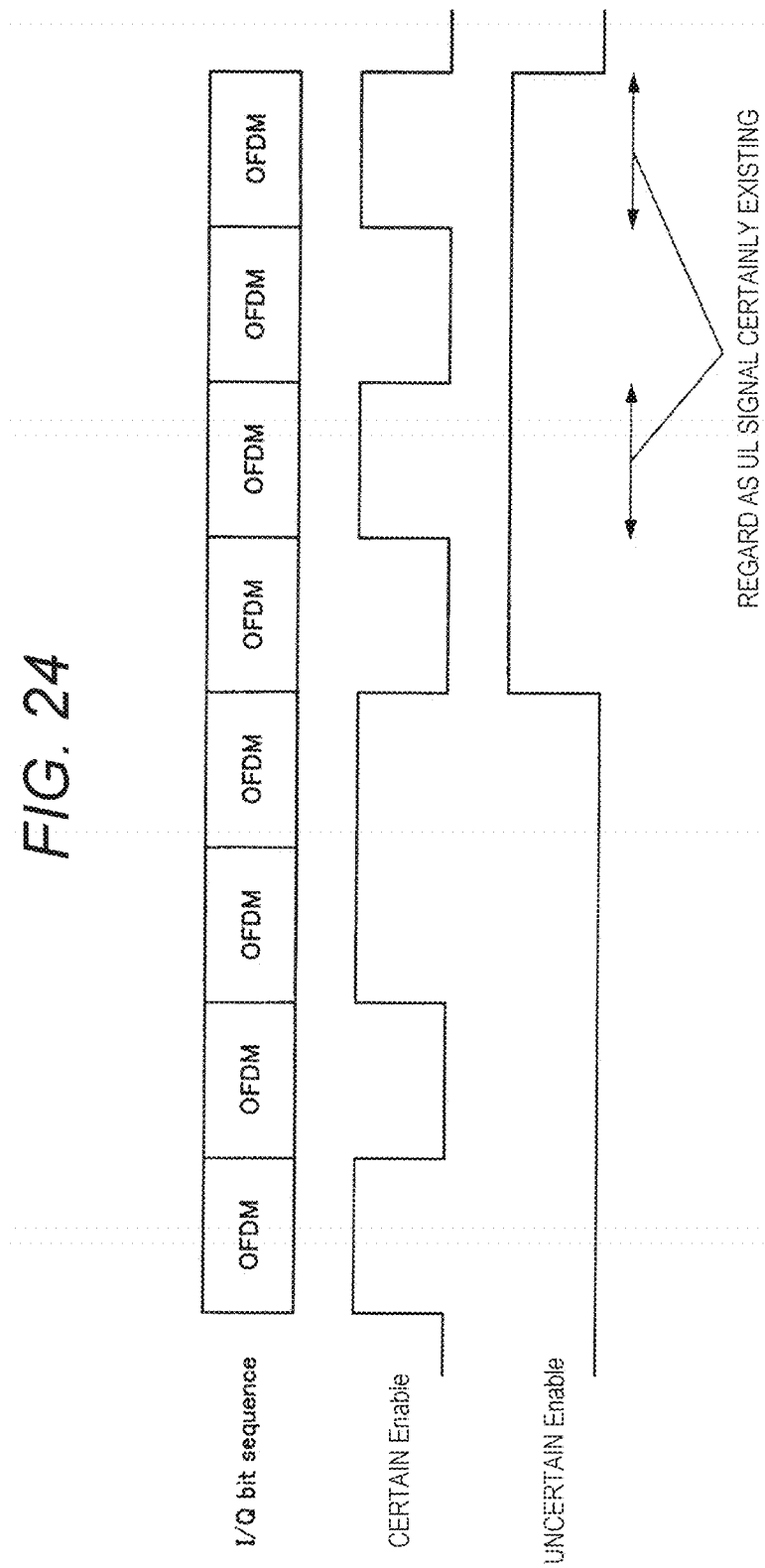

WIRELESS COMMUNICATION APPARATUS AND COMMUNICATION CONTROL METHOD

CROSS-REFERENCE TO RELATED APPLICATIONS

The present application is based on PCT filing PCT/JP2019/027351, filed Jul. 10, 2019, which claims priority to JP 2018-151269, filed Aug. 10, 2018, the entire contents of each are incorporated herein by reference.

TECHNICAL FIELD

The present disclosure relates to a wireless communication apparatus and a communication control method.

BACKGROUND ART

Nowadays, as a configuration of a base station system that provides a wireless service, a separated base station having a configuration in which a base band processing unit (BBU; Base Band Unit) that processes a base band signal, and a wireless unit (RRH; Remote Radio Head) that transmits and receives radiowaves to and from antennas are separated has become common. Examples of documents that disclose such a separated base station include Patent Documents 1 and 2.

CITATION LIST

Patent Document

Patent Document 1: Japanese Patent Application Laid-Open No. 2018-14697
Patent Document 2: Japanese Patent Application Laid-Open No. 2018-23035

SUMMARY OF THE INVENTION

Problems to be Solved by the Invention

In a case where a simple configuration in which a BBU is arranged in a cloud base on a network, and an RRH includes an antenna, an RF circuit, and an AD/DA converter is employed from among configurations of such a separated base station, how a data amount is suppressed becomes important especially in a case where the number of antennas increases.

In view of the foregoing, the present disclosure proposes a wireless communication apparatus and a communication control method that are novel and improved, and can efficiently reduce a data amount between an RRH and a BBU in a configuration of a separated base station in which a BBU is arranged in a cloud base on a network.

Solutions to Problems

According to the present disclosure, a wireless communication apparatus including two-dimensionally-arrayed antenna elements, and an arrangement unit configured to arrange IQ data of signals output from the antenna elements, for each time in a state in which an array of the antenna elements is maintained is provided.

Furthermore, according to the present disclosure, a wireless communication apparatus including two-dimensionally-arrayed antenna element, a compression unit configured to execute compression processing on IQ data of signals output from the antenna elements, and a beam forming unit configured to execute beam forming processing on the IQ data before compression processing is performed by the compression unit is provided.

Furthermore, according to the present disclosure, a communication control method including acquiring IQ data of signals output from two-dimensionally-arrayed antenna elements, and arranging the IQ data for each time in a state in which an array of the antenna elements is maintained is provided.

Furthermore, according to the present disclosure, a communication control method including acquiring IQ data of signals output from two-dimensionally-arrayed antenna elements, executing compression processing on the IQ data, and executing beam forming processing on the IQ data before the compression processing is provided.

Effects of the Invention

As described above, according to the present disclosure, a wireless communication apparatus and a communication control method that are novel and improved, and can efficiently reduce a data amount between an RRH and a BBU in a configuration of a separated base station in which a BBU is arranged in a cloud base on a network can be provided.

Note that the above-described effect is not always limitative, and together with the above-described effect or in place of the above-described effect, any of the effects described in this specification, or other effects recognized from this specification may be caused.

BRIEF DESCRIPTION OF DRAWINGS

FIG. 8 is an explanatory diagram illustrating an example of storing AD-converted data as two-dimensional complex data.

FIG. 23 is an explanatory diagram illustrating an example of an indicator to be output from a BBU to an RRH.

FIG. 24 is an explanatory diagram illustrating an example of an indicator to be output from a BBU to an RRH.

MODE FOR CARRYING OUT THE INVENTION

Figure 1:
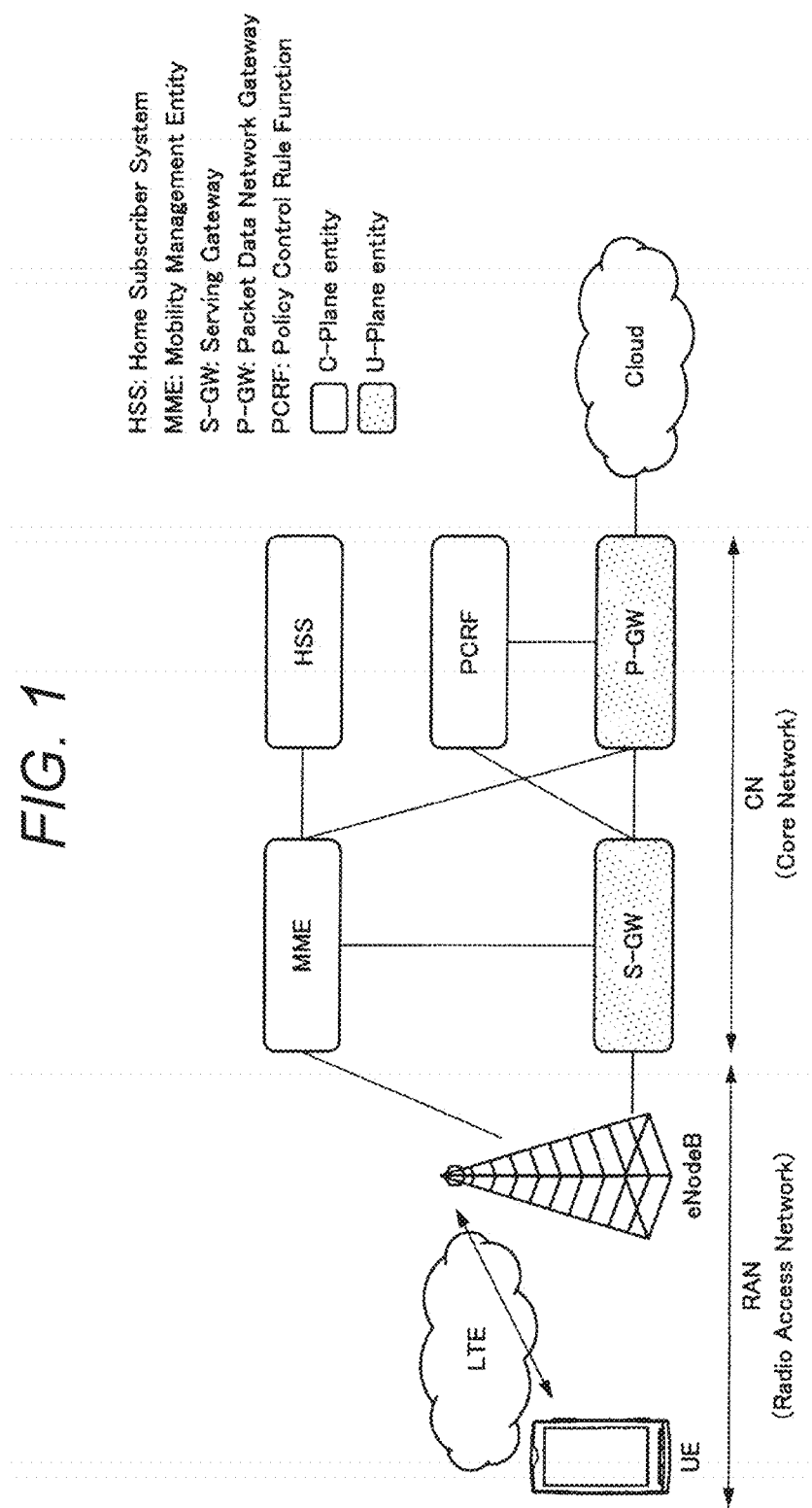
FIG. 1 is an explanatory diagram illustrating a schematic configuration of an RAN.

Hereinafter, a preferred embodiment of the present disclosure will be described in detail with reference to the attached drawings. Note that, in this specification and the drawings, the redundant description will be omitted by allocating the same reference numerals to the components having substantially the same functional configuration.

Note that the description will be given in the following order.
1. Embodiment of Present Disclosure
1.1. Background
1.2. Description of Embodiment
1.3.
2. Conclusion

1. Embodiment of Present Disclosure

1.1. Background

Before describing an embodiment of the present disclosure in detail, the background of an embodiment of the present disclosure will be described.

As described above, a separated base station having a configuration in which a base band processing unit (BBU) that processes a base band signal, and a wireless unit (RRH) that transmits and receives radiowaves to and from antennas are separated has become common. Here, as an interface between the base band processing unit and the wireless unit, for example, a general-purpose interface complying with a Common Public Radio Interface (CPRI) standard or the like is defined. In the CPRI standard, the base band processing unit is also called a wireless control apparatus (Radio Equipment Controller: REC) and the wireless unit is also called a wireless apparatus (Radio Equipment: RE). Furthermore, in the CPRI standard, user data (also called U-plane data, digital base band signal, data signal) transmitted between the wireless control apparatus and the wireless apparatus is also called In-phase and Quadrature (IQ) data.

(New Radio Access and New Core)

Figure 2:
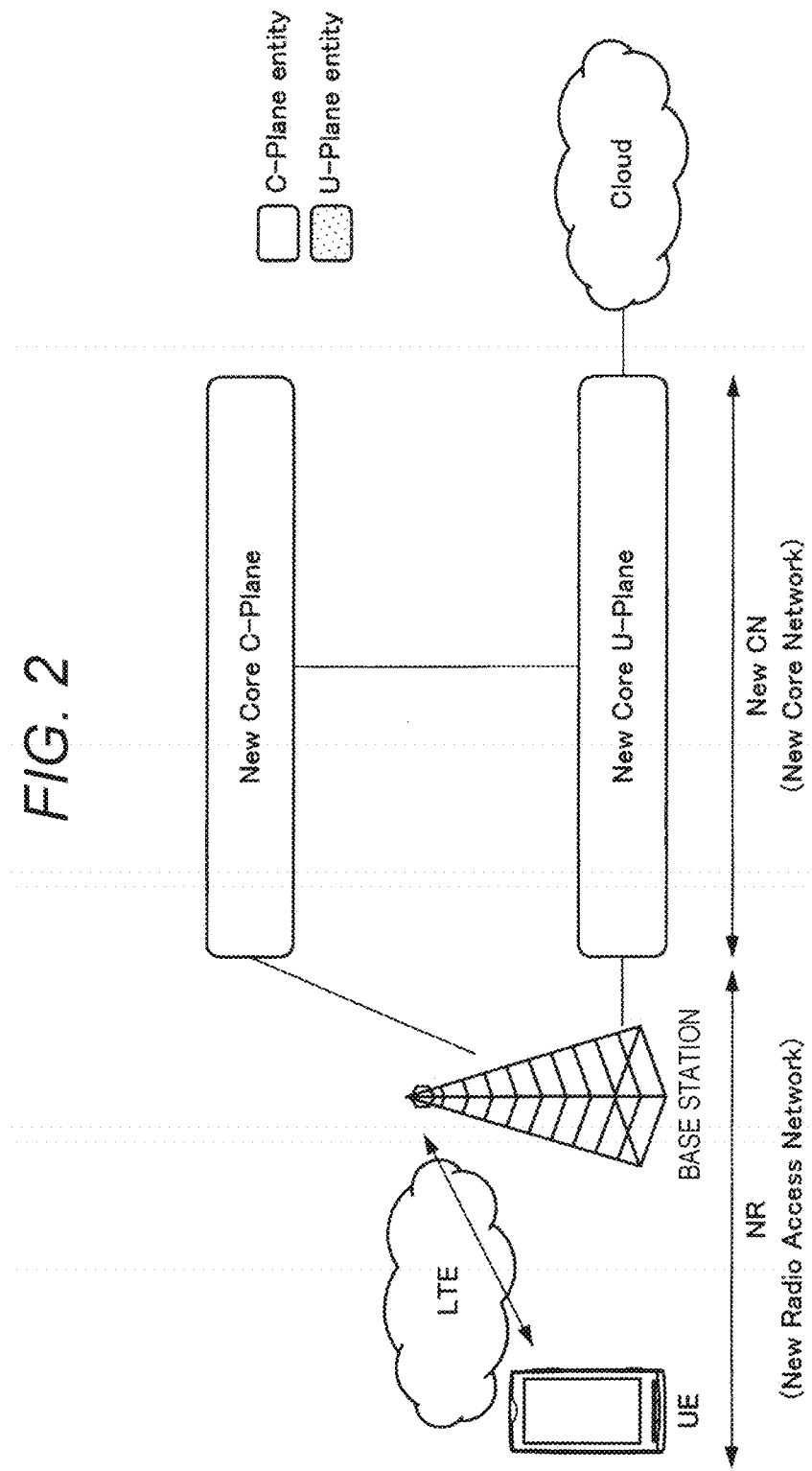
FIG. 2 is an explanatory diagram illustrating a schematic configuration of an NR.

In the Third Generation Partnership Project (3GPP), New Radio Access (NR) is considered as a successor of a Radio Access Network (RAN) called Long Term Evolution (LTE). FIG. 1 is an explanatory diagram illustrating a schematic configuration of an RAN. FIG. 2 is an explanatory diagram illustrating a schematic configuration of an NR. Furthermore, New Core is considered as a successor of a core network (CN) called an Evolved Packet Core (EPC).

The feature of the NR is to implement high-speed high-capacity communication using a frequency band of 6 GHz or more and up to 100 GHz. A cellular system includes an RAN and a CN. An RAN portion requires most of the cost of the cellular system. This is because several thousands of RANs are installed, which is extremely large in number as compared with CNs. Several tens of CNs are considered to be installed.

(C-RAN)

A base station requires extremely high calculator cost. However, the number of terminals connecting to each base station varies with time. Not all the base stations always use the maximum value of processing capacity. Thus, if the capacity of calculators of base stations can be shared between a plurality of base stations, it becomes possible to decrease the cost of calculators. Furthermore, it is also possible to reduce power consumed in base stations.

The base station includes an analogue portion including an antenna and an RF circuit, an AD/DA converter arranged at the boundary between the analogue portion and a digital portion, and the digital portion that performs complicated digital signal processing. The digital portion can include a Field Programmable Gate Array (FPGA) or a Digital Signal Processor (DSP), but can be processed by a general-purpose calculator.

A C-RAN (Cloud RAN, Centralized RAN, Clean RAN) is an RAN that can process an enormous calculation amount using a server on a network side.

As described above, a case where functions of a base station are separated into two corresponding to an RRH and a BBU will be considered. For example, an antenna, an RF circuit, and an AD/DA converter are arranged in the RRH, and a digital signal processing portion of PHY/MAC of remaining digital units is arranged in the BBU. The C-RAN processes the BBU portion on a cloud.

Because BBUs of a plurality of base stations can be processed by a common server as for the BBU portion arranged on a cloud, the cost of base stations can be decreased. Because it is sufficient that a general-purpose processing server adapted to a processing amount required for a plurality of base stations is prepared, low cost can be realized.

On the other hand, base stations need to be arranged in many locations. In particular, if a frequency to be used becomes higher, a range covered by one base station becomes narrower, and an extremely large number of base stations are required to be arranged. Therefore, further cost saving of an RRH is seriously demanded.

Figure 3:
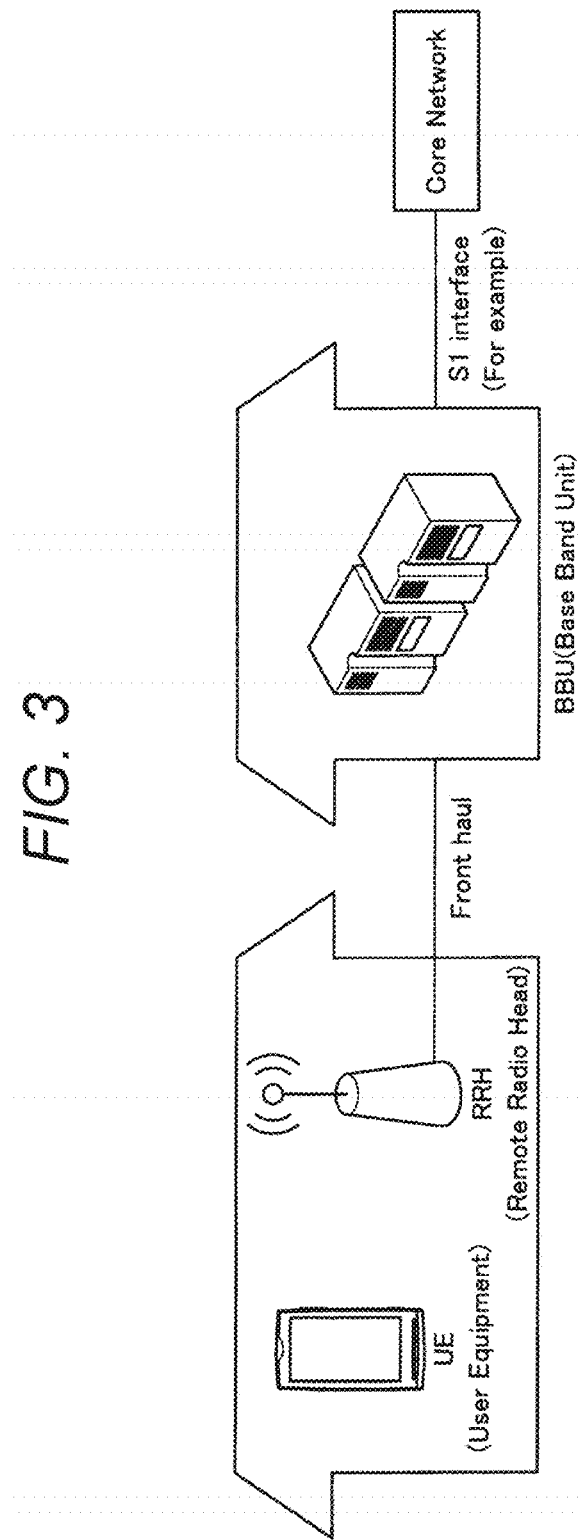
FIG. 3 is an explanatory diagram illustrating an arrangement example of an RRH and a BBU.

From the above points, it can be said that a future cellular network is high likely to include an RRH and a BBU of a C-RAN. FIG. 3 illustrates a conceptual diagram in which a BBU is arranged in a server in the home, and an RRH is connected to a portion of an outdoor antenna unit via a front haul being an optical fiber. The BBU is connected with a core network via an optical fiber serving as a back haul. It should be appreciated that the optical fiber is a typical example, and can be replaced with an ADSL or wireless communication.

Table 1 indicates an example of a function of an RRH, and Table 2 indicates an example of a function of a BBU.

TABLE 1

(Example of Function of RRH0)

| Uplink | Downlink |
|---|---|
| A/D | D/A |
| I/Q data transmitter | I/Q data receiver |
| E/O conversion | O/E conversion |

TABLE 2

(Example of Function of BBU)

| Uplink | Downlink |
|---|---|
| O/E conversion | E/O conversion |
| Cyclic prefix removal | Cyclic prefix insertion |
| FFT | IFFT |
| Chanel de-coding | Channel coding |
| Modulation | De-Modulation |
|  | Mac scheduling |

(Front Haul and Back Haul)

As illustrated in FIG. 3, a front haul is provided between the RRH and the BBU, and a back haul is provided between the BBU and an S-GW. The front haul is an interface that has become necessary by separating the base station into the RRH and the BBU. While the front haul is sometimes wirelessly connected, the front haul is generally connected via a wired optical interface.

A communication speed generally required of a conventional front haul is about 10 Gbps. Via the front haul, AD-converted data or DA-converted data needs to be transferred, and data needs to be transferred while being at a signal point of an I/Q axis. Therefore, a large data transfer speed is required of an interface of the front haul.

On the other hand, data flowing via the interface of the back haul is a bit sequence determined from a signal point of the I/Q axis. Because an information amount of data flowing via the interface of the back haul becomes a bit sequence comprehensively determined from signals of a plurality of antennas, the information amount becomes several Gbps at most. The back haul serves as an interface with a gateway (S-GW as a term of EPC) bundling a plurality of base stations.

Thus, because a switch anterior to the S-GW needs to bundle information from several tens to several thousands of base stations, processing capacity of several terabits/s is required. Thus, although data processing in a core network is not easy, a processing speed can be reduced by arranging the BBU on the cloud side and performing traffic offload. On the other hand, in the current condition, the front haul requires a speed of about 10 Gbps for one line. Thus, the front haul becomes a critical point.

(Data Transfer Speed Required of Front Haul)

A data transfer speed required of the front haul depends on the number of AD/DA converters. Normally, an AD converter often requires a larger bit depth than a DA converter. For example, when an AD converter represents a waveform in 10 bits, a DA converter represents a waveform in eight bits. As a matter of course, if a bit depth of an AD converter increases, a data transfer speed required of the front haul increases.

Furthermore, a sampling rate of an AD converter affects a data transfer speed. When a frequency bandwidth used in the operation in an RAN is 20 MHz, an AD converter with 40 Msps (sampling per second) becomes necessary. This is attributed to a sampling theorem defining that sampling needs to be performed at a double frequency of a handled frequency. Because a wide frequency bandwidth such as 1 GHz is assumed in the NR of 5G, a sampling frequency required of an AD converter becomes 2 Gsps.

An element affecting next is the number of component carriers. 32 component careers (CC) with 1-GHz width can be used at most. This is called carrier aggregation. If the number of component carriers increases, burden on the front haul accordingly increases.

An element affecting next is the number of AD converters. In a case where the number of antennas is 30, for example, 30 AD converters are required.

Table 3 lists elements affecting a transfer speed of a front haul.

TABLE 3

(Element Affecting Transfer Speed of Front Haul)

| Element | Typical numerical value | Description |
|---|---|---|
| Bit depth of AD converter | 8 bit-12 bit | |
| Sampling rate of AD converter | 20 Msps-2 Gsps | Depending on bandwidth 10 MHz–1 GHz Sampling in equal to or larger than double of bandwidth is required |
| Number of Component Carriers | 1-32 | Might increase in the future |
| Number of AD converters required for ICC | 1-64 | Attributed to the number of antennas. 32 AD converters are required when the number of antennas is 256, the number of analogue beams is 8, and the number of branches is 32. |

According to Table 3, a required transfer speed of the front haul becomes 12×2G×32×32=24 Tbps at most.

(Hybrid Antenna Architecture)

For example, in a case where a base station includes 256 antennas, a DA/AD converter handling all of the antennas is required in some cases. This is called Full Digital Antenna architecture. In this case, because it becomes possible to adjust amplitudes and phases of all the antennas in a digital domain, the freedom degree of directivity of antenna becomes largest. Different antenna directivities can be used for the respective different frequencies.

However, this method increases the number of RFs, and a large number of AD/DA converters is also required. Moreover, a signal processing amount in a digital domain also increases.

Figure 4:
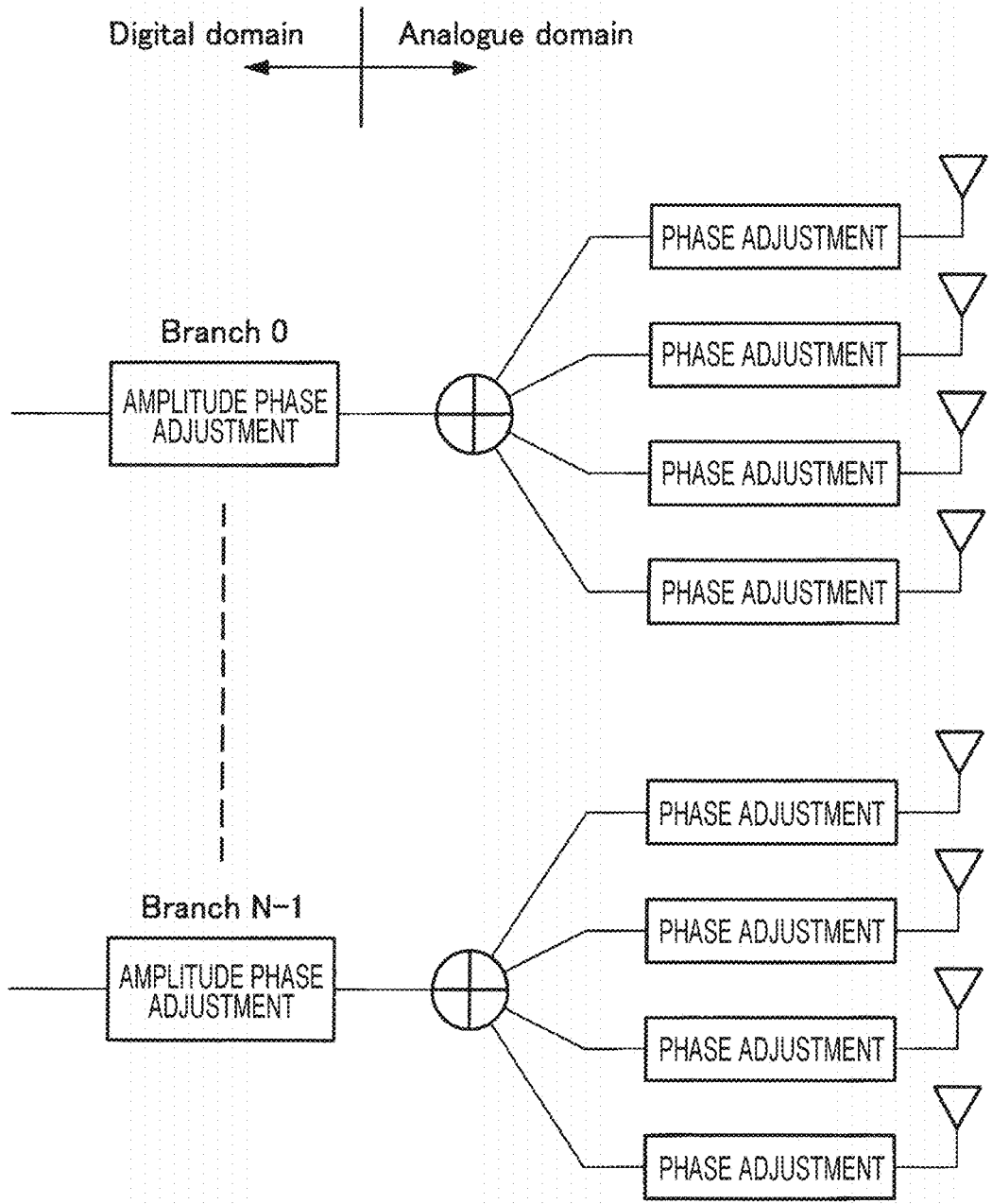
FIG. 4 is an explanatory diagram illustrating an Analogue/Digital Hybrid Antenna architecture.

The Analogue/Digital Hybrid Antenna architecture has been conceived in view of the foregoing. As illustrated in FIG. 4, the Analogue/Digital Hybrid Antenna architecture is an architecture of reducing the number of branches that can digitally adjust both amplitude and phase by connecting a plurality of antennas via a phase shifter that can adjust only a phase in an analogue unit. From the aspect of the influence on the front haul, it is desirable to use the Hybrid Antenna architecture that can reduce the number of branches.

(Various Use Cases)

Here, Table 4 lists a throughput of a front haul required for each use case in consideration of the above-described Hybrid Antenna architecture.

TABLE 4

(Throughput Example of Front Haul)

| Use case | Frequency bandwidth | Number of CCs | Antenna architecture | Bit depth of AD converter (required for each I/Q) | AD converter sampling | Throughput required for front haul |
|---|---|---|---|---|---|---|
| 1 | 10 MHz | 2 | 2Digital = 2 | 10 bit | 20M | 1.6 Gbps |
| 2 | 10 MHz | 5 | 8Digital*8Analogue = 64 | 10 bit | 20M | 16 Gbps |
| 3 | 10 MHz | 5 | 16Digital*8Analogue = 128 | 10 bit | 20M | 32 Gbps |
| 4 | 10 MHz | 10 | 32Digital*8Analogue = 256 | 10 bit | 200M | 1280 Gbps |
| 5 | 10 MHz | 32 | 32Digital*8Analogue = 256 | 10 bit | 200M | 4 Tbps |
| 6 | 1 GHz | 10 | 16Digital*8Analogue = 128 | 10 bit | 2 G | 6.4 Tbps |
| 7 | 1 GHz | 32 | 32Digital*32Analogue = 1024 | 10 bit | 2 G | 40 Tbps |
| 8 (Cat-M) | 1.4 MHz | 1 | 1 | 10 bit | 2.8M | 56 Mbps ADSL is also applicable |
| 9 | 100 MHz | 5 | 32Digital*8Analogue = 256 (If analogue antenna processing is performed in RRH) | 10 bit | 200M | 640 GHZ |

The speed of a normal Ethernet (registered trademark) cable is about 1 Gbps. Furthermore, an optical fiber is laid to the home, but the maximum speed as a service is 1 Gbps. This is because, when an Ethernet (registered trademark) cable is connected, a speed of 1 Gbps or more might fail to be effectively utilized.

In the current condition, an allowable speed of the front haul inside a home or an office can be said to be about 1 Gbps. Thus, in the current condition, only a use case 1 can realize a C-RAN. As a matter of course, the following technologies can be applied to other use cases.

The capacity of an optical fiber is 10 Gbps in the case of time-division multiplexing, and transfer can be performed at 10 Tbps if wavelength-division multiplexing or multilevel modulation is used. The maximum value of the capacity of an optical fiber actually used for commercial use is considered to be 10 Gbps. Thus, in a case where a dedicated optical fiber is laid to an outdoor RRH, a communication speed that can be used for the front haul is 10 Gbps, and in a case where an RRH is provided inside a home, the communication speed is 1 Gbps. As a matter of course, communication at the speed equal to or higher than the speed is considered to be used in the front haul.

(Common Public Radio Interface (CPRI))

There is a standard of CPRI. Option1 is a front haul that can perform transmission at 614.4 Mbit/s, and Option10 is a front haul that can perform transmission at 24.33 Gbit/s. Basically, the standard defines how a synchronization signal is transmitted, and how I/Q data is multiplexed by TDM, and does not define how to reduce a signal to be transmitted.

As a bit sequence itself of I/Q, a bit sequence corresponding to one antenna or one carrier is defined as a bit sequence (A×C container) of I/Q. A bit sequence corresponding to a plurality of antennas or component carriers is obtained by multiplexing this A×C container. Note that the CPRI is not a standard in the 3GPP, but the CPRI is defined to be applicable to the 3GPP. In the future, there is a possibility that the CPRI is utilized for considering the standard of 3GPP and is standardized.

(Received Data and Transmitted Data of Base Station)

In many cases, data received by a base station requires a larger data amount than transmitted data. The present embodiment can be applied to both reception and transmission in a base station, but a technology will be first described using a flow of a signal on the reception side of the base station. This is because the description using processing on the reception side is considered to be important since wireless signal processing generally requires larger signal processing capacity on the reception side, and a C-RAN essentially aims to reduce signal processing on the reception side.

Figure 5:
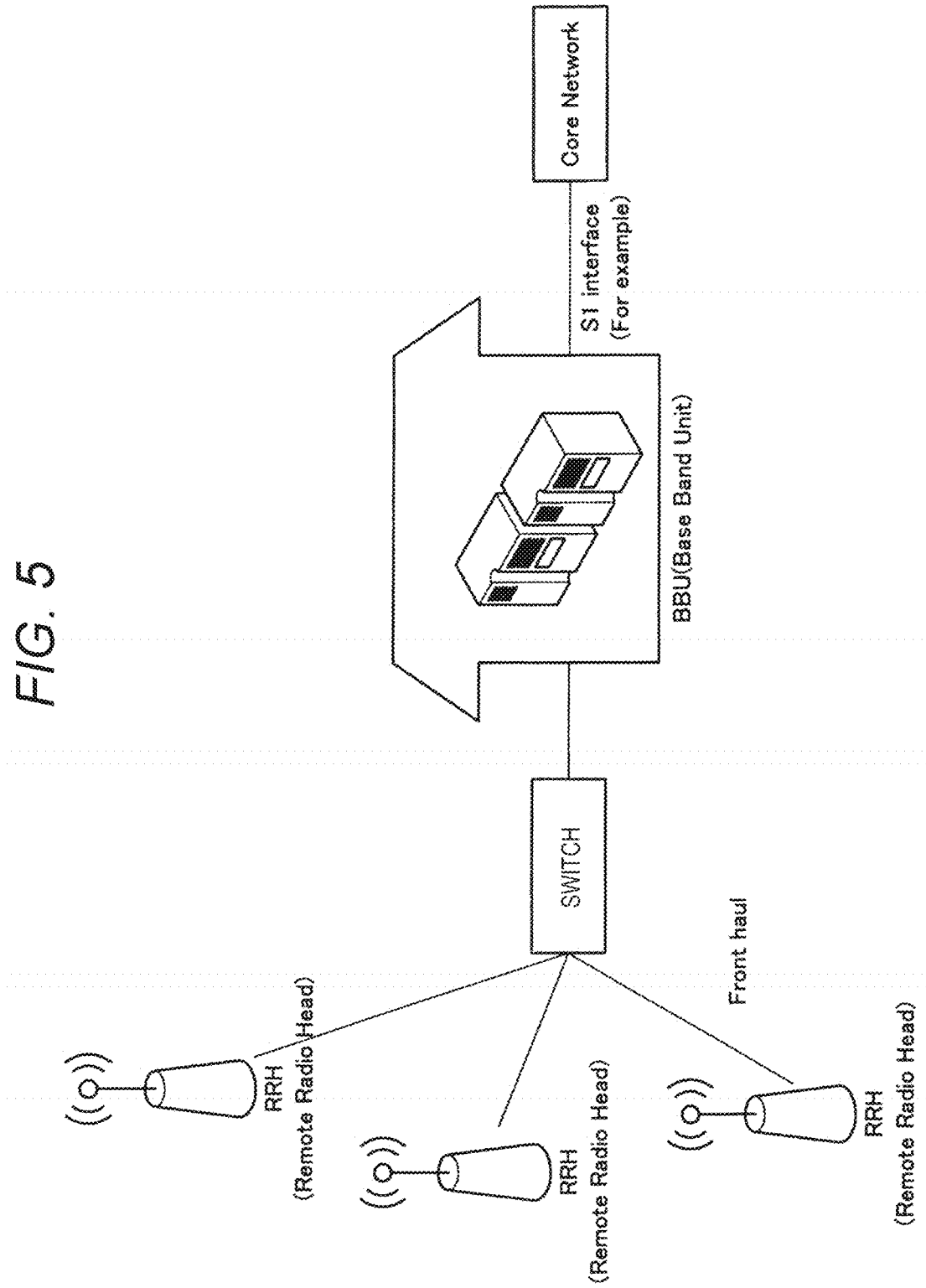
FIG. 5 is an explanatory diagram illustrating that data of a plurality of RRH is consolidated by a switch anterior to a BBU.

In short, a data transfer amount with the back haul that is required of the front haul is desired to be reduced. If an optical fiber that can transfer all data generated by the RRH exists, as illustrated in FIG. 5, because data of a plurality of RRHs is consolidated by the switch anterior to the BBU, if data packet is congested in this switch, a packet loss occurs. Thus, it is always demanded to reduce an amount of data to be transmitted from each RRH to the BBU.

In a case where an access speed to a memory is 10 GB/s and an access speed to an HDD is 100 MB/s as a presumption, in the case of employing a method of accumulating data into a hard disc and then transferring data to a cloud using a front haul, a method such as a method of preparing a different hard disc for one CC or one DA converter, for example, becomes necessary. There is a method of accumulating data using a memory having higher access speed than that of an HDD, but cost of the memory becomes extremely high. Thus, burden on the RRH becomes basically smaller when data is sequentially transmitted to a cloud using a wired network while processing data in the RRH.

In view of the foregoing, in the present embodiment, as described below, a technology for efficiently reducing an amount of data transmitted by an RRH to a BBU, and reducing processing burden on the RRH will be described.

1.2. Description of Embodiment (1. Format of Data Container of I/Q)

Figure 6:
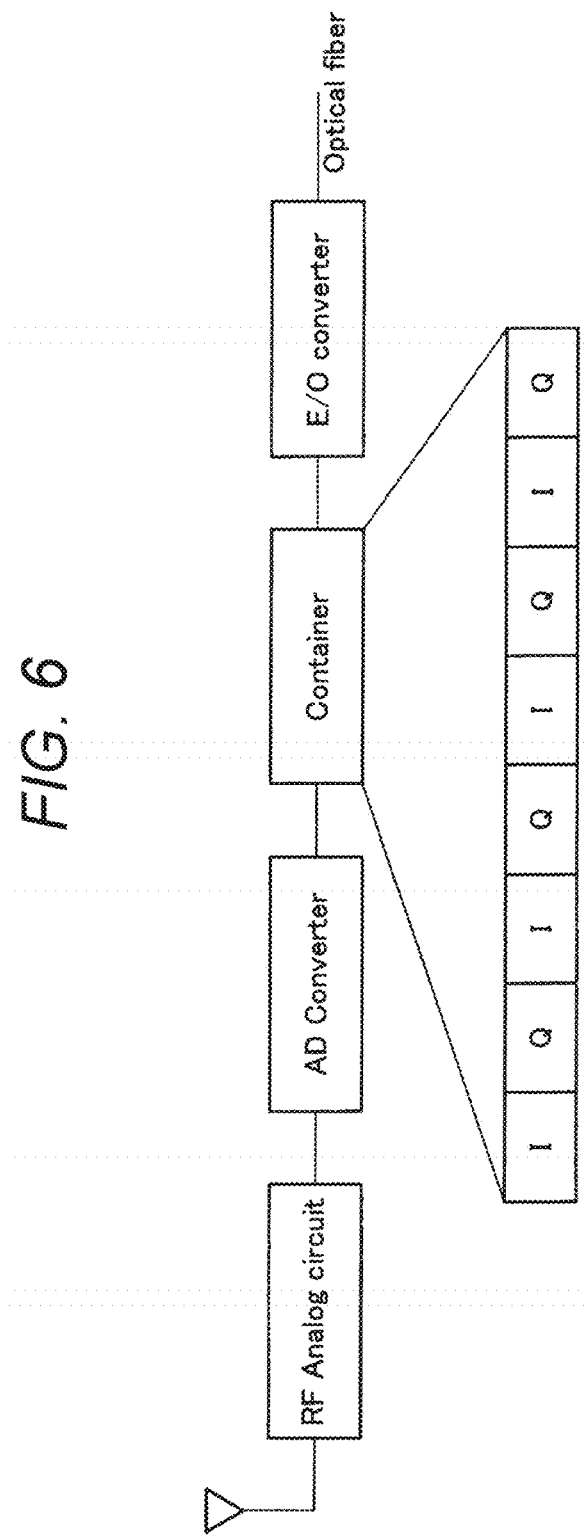
FIG. 6 is an explanatory diagram illustrating a format of a data container of an I/Q.

If a bit sequence corresponding to one antenna or one component carrier is defined as a processing-based container, as illustrated in FIG. 6, relationship between different antennas is completely separated. In consideration of performing compression using correlation between data received by different antennas, it is easier to compress information using a compression algorithm when information from a plurality of antennas is stored into one container.

In the present embodiment, the RRH stores information from an AD converter corresponding to a plurality of antenna elements corresponding to one time, into one container. Then, by chronologically arranging the containers, the RRH according to the present embodiment creates a data structure of the front haul. Because correlated signals received by a plurality of antenna elements are stored into the same container by the RRH, the signals can be easily compressed before being stored into the container, which is advantageous. Furthermore, also in the case of processing data on the BBU side of the cloud, it is easier to process information when information from a plurality of antenna elements is delivered at the same time. This is because such a shortcoming that it has been necessary to wait for data from a plurality of antenna elements when antenna signal processing is performed on the BBU side can be overcome.

A two-dimensional array antenna has a configuration in which antenna elements are arranged in a vertical direction and a horizontal direction. An input of radiowaves to antenna elements varies only in phase, and basically the same signal comes. This works out in a case where a signal generation source is sufficiently far as compared with an interval between antenna elements (called far solution approximation).

Thus, information between antenna elements can be compressed using an information compression algorithm. A difference in phase between antennas varies for each signal generation source depending on the direction from which the signal generation source comes, but if a compression algorithm used for compression of a normal moving image is used, for example, compression can be performed in such a manner as to encompass a phase difference between antennas.

In the present embodiment, in a case where antenna elements are two-dimensionally arranged like a two-dimensional array antenna, information regarding I/Q is arranged like pixels of video data while maintaining the two-dimensional structure, and the information regarding I/Q is stored into a container in such a manner as to keep time, that is to say, in such a manner that data at different times become two-dimensional images at different times.

Here, an image does not have the concept of I/Q, but a method that is based on two-dimensional discrete Fourier transform can be used for the compression of an image system. In this case, because input data to two-dimensional discrete Fourier transform can be given using a complex number, two-dimensional complex data is obtained from data in which antennas are two-dimensionally arranged. By taking out low-frequency components after performing two-dimensional Fourier transform on two-dimensional complex data, the compression of data can be performed.

Figure 7:
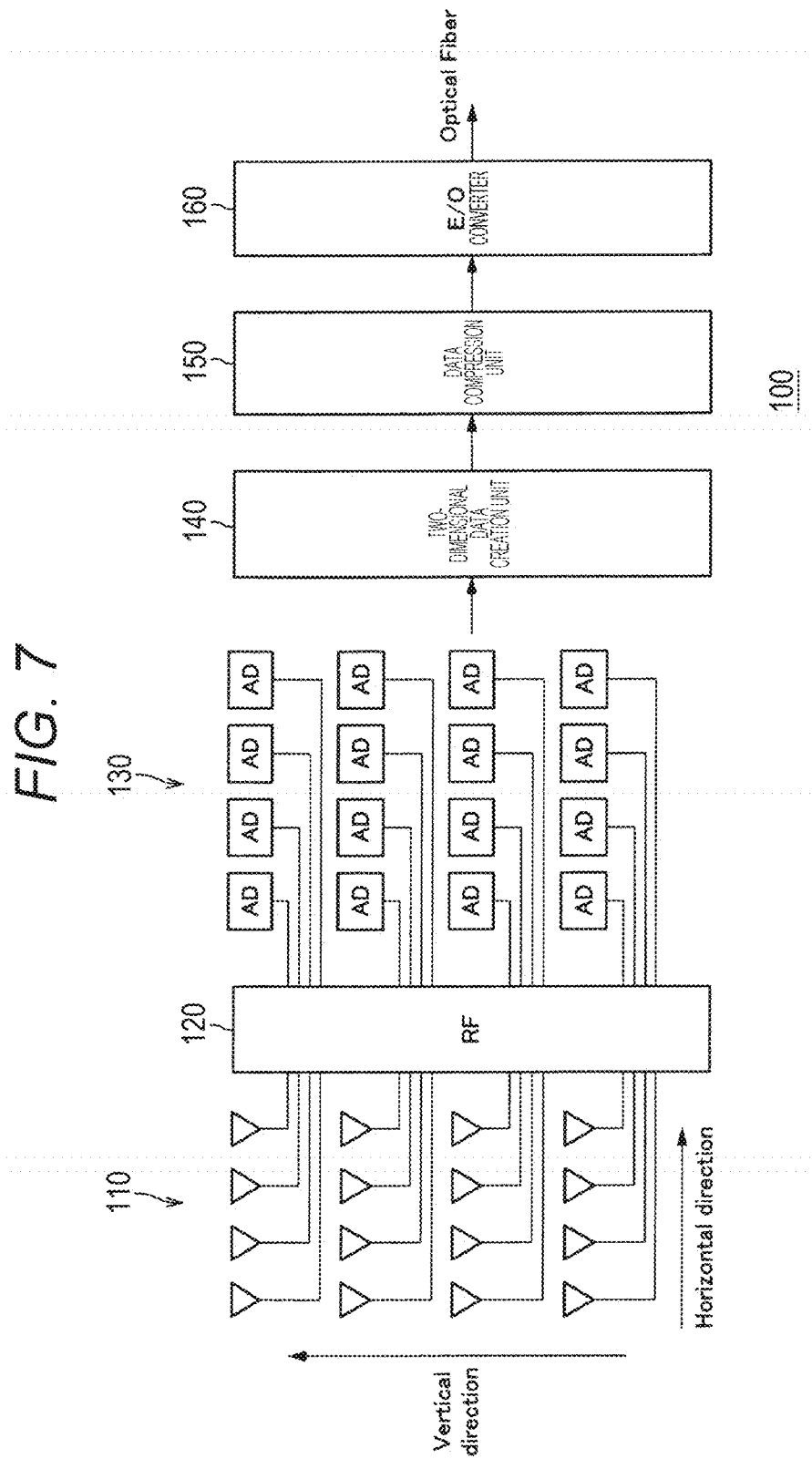
FIG. 7 is an explanatory diagram illustrating a configuration example of an RRH according to an embodiment of the present disclosure.

FIG. 7 is an explanatory diagram illustrating a configuration example of an RRH according to an embodiment of the present disclosure. An RRH 100 illustrated in FIG. 7 includes a two-dimensional array antenna 110, an RF circuit 120, an AD converter 130, a two-dimensional data creation unit 140, a data compression unit 150, and an E/O converter 160.

The two-dimensional array antenna 110 is an antenna array in which antennas that receive radiowaves from a terminal serving as a communication partner, and transmit radiowaves to the terminal are arranged in an array. The RF circuit 120 is an analogue circuit that executes reception processing on a signal received by the two-dimensional array antenna 110. The RF circuit 120 may include a mixer, a filter, and an amplifier.

The AD converter 130 is a circuit that converts an analogue signal output by the RF circuit 120, into a digital signal. The two-dimensional data creation unit 140 generates two-dimensional complex data as described later, from data output by the AD converter 130. The data compression unit 150 executes compression processing on the two-dimensional complex data generated by the two-dimensional data creation unit 140. At this time, the data compression unit 150 compresses the two-dimensional complex data in consideration of correlation between antenna elements of the two-dimensional array antenna 110. Then, the E/O converter 160 converts an electrical signal into an optical signal for transmitting the converted signal to the BBU from the RRH via an optical fiber.

FIG. 8 illustrates an example of storing AD-converted data from two-dimensionally arranged antennas, as two-dimensional complex data by the two-dimensional data creation unit 140. D(i,j) indicates that corresponding data is I/Q data corresponding to i-th data in the vertical direction and j-th data in the horizontal direction.

Because the data in FIG. 8 is data from the two-dimensional antennas at one time, series of data is obtained by chronologically arranging the data in FIG. 8. A delimiter of a container may be a delimiter as illustrated in FIG. 8, or data may be stored into the container every certain period of time. Here, the certain period of time is based on the time of one sample of an AD converter.

Here, an important point lies in that information indicating the numbers of images in the vertical and horizontal directions (4×4 in the example in FIG. 8) is conveyed to a compression algorithm in the data compression unit 150. This becomes an interface between a container block (two-dimensional data creation unit 140) and a compression function (the data compression unit 150). This notification itself may be set as a configuration of a base station or may be defined as a standard.

Note that the number of analogue circuits in one RRH is limited. Therefore, connection between an antenna and an analogue circuit is sometimes changed in one RRH. In this case, because the numbers of antennas in the horizontal direction and the vertical direction of the array antenna also change, the RRH 100 rearranges the container in accordance with the change, and notifies the BBU of the size of the array of the array antenna. In other words, the RRH 100 may store partial data of data from the two-dimensional array antenna 110 into the container by the two-dimensional data creation unit 140. Even in a case where connection between an antenna and an analogue circuit is changed in the RRH, in the BBU, compressed data can be decompressed.

(2. Storage Method into Container Corresponding to Antenna System that Uses Polarization)

Figure 9:
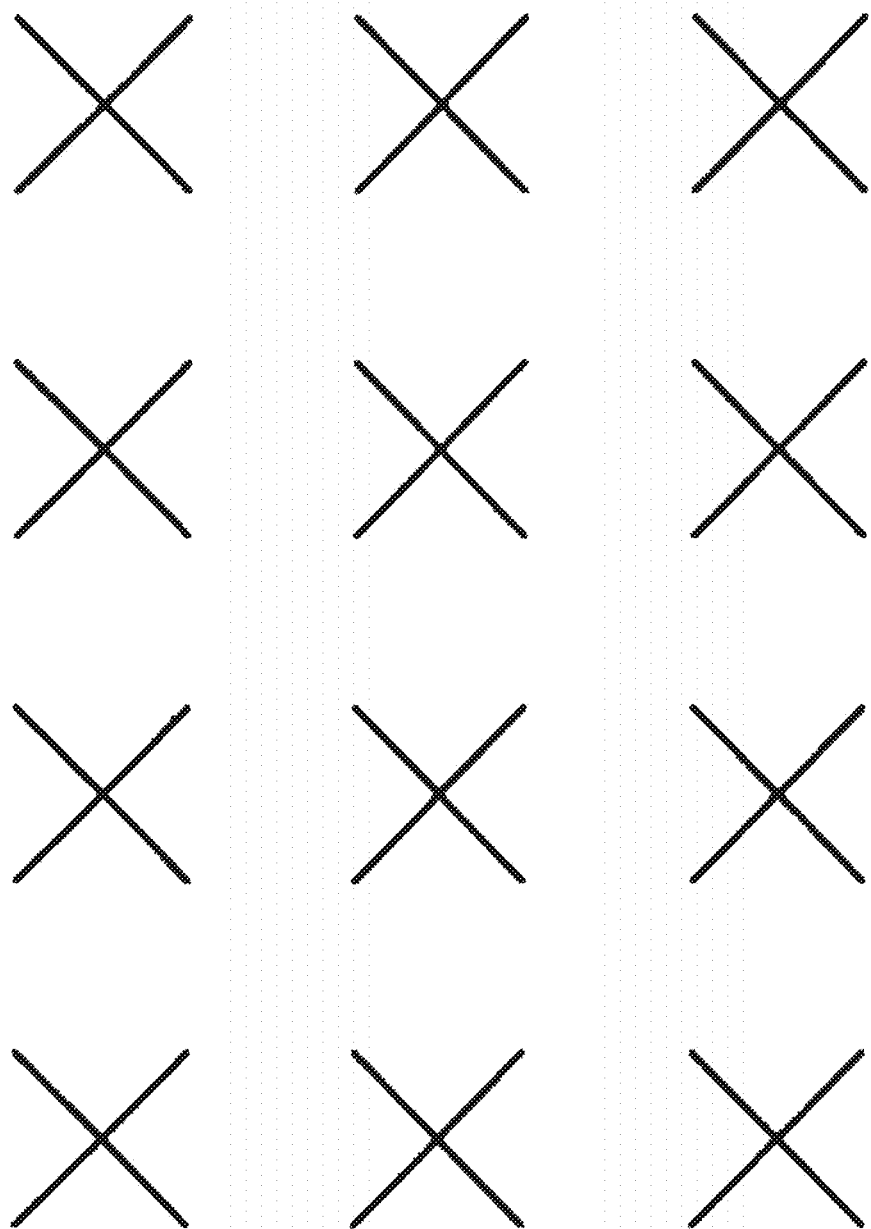
FIG. 9 is an explanatory diagram illustrating an example of an antenna element.

In a case where N antenna elements are arranged in the horizontal direction and M antenna elements are arranged in the vertical direction, N×M antenna elements become necessary as antenna elements of 5G NR as illustrated in FIG. 9. In some cases, a method of additionally preparing another set of N×M antenna elements using polarization is used. Antenna elements having different polarization planes are placed at almost the same location. It may be considered that two antenna elements that receive different polarizations are arranged at the location of each of the N×M antenna elements. Such an antenna is called a cross polarization antenna. A method of storing I/Q data into a container in the case of such an antenna configuration will be described.

Figure 10:
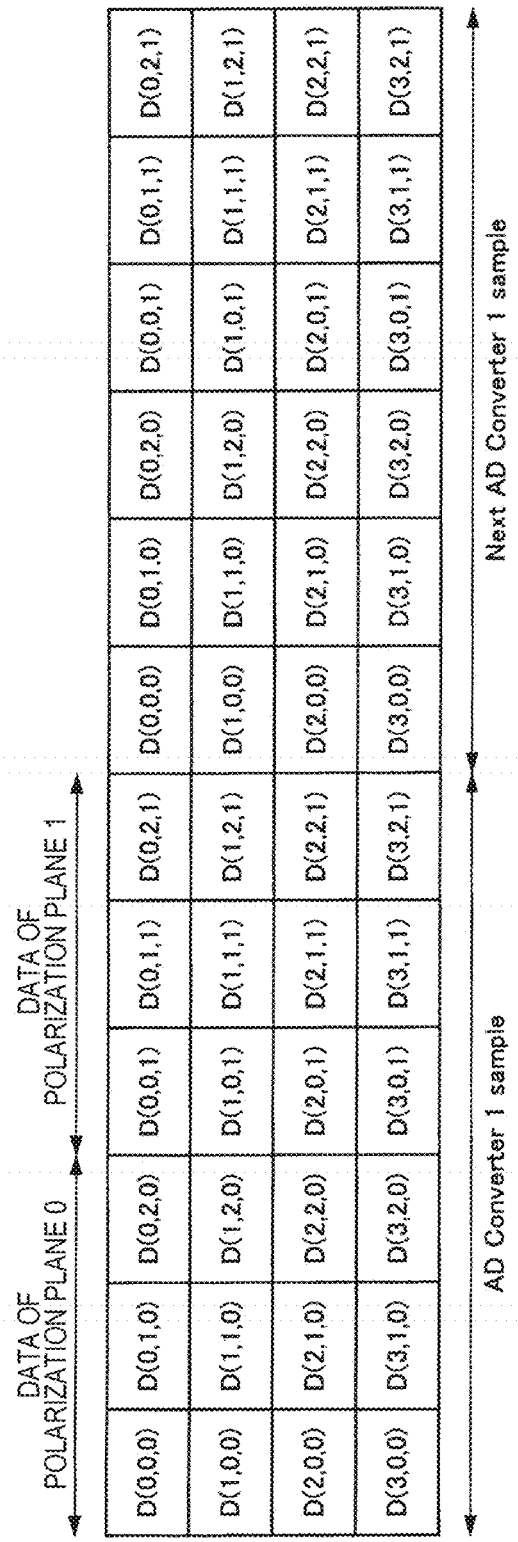
FIG. 10 is an explanatory diagram illustrating a storage example into a container of data attributed to different polarization.

The RRH 100 according to the present embodiment stores data attributed to different polarizations in such a manner that the data is not mixed with each other. FIG. 10 is an explanatory diagram illustrating a storage example into a container of data attributed to different polarization. Also in a case where an operation such as compression is added to the stored data, the operation is separately performed in such a manner that data attributed to different polarizations is not mixed with each other.

Figure 11:
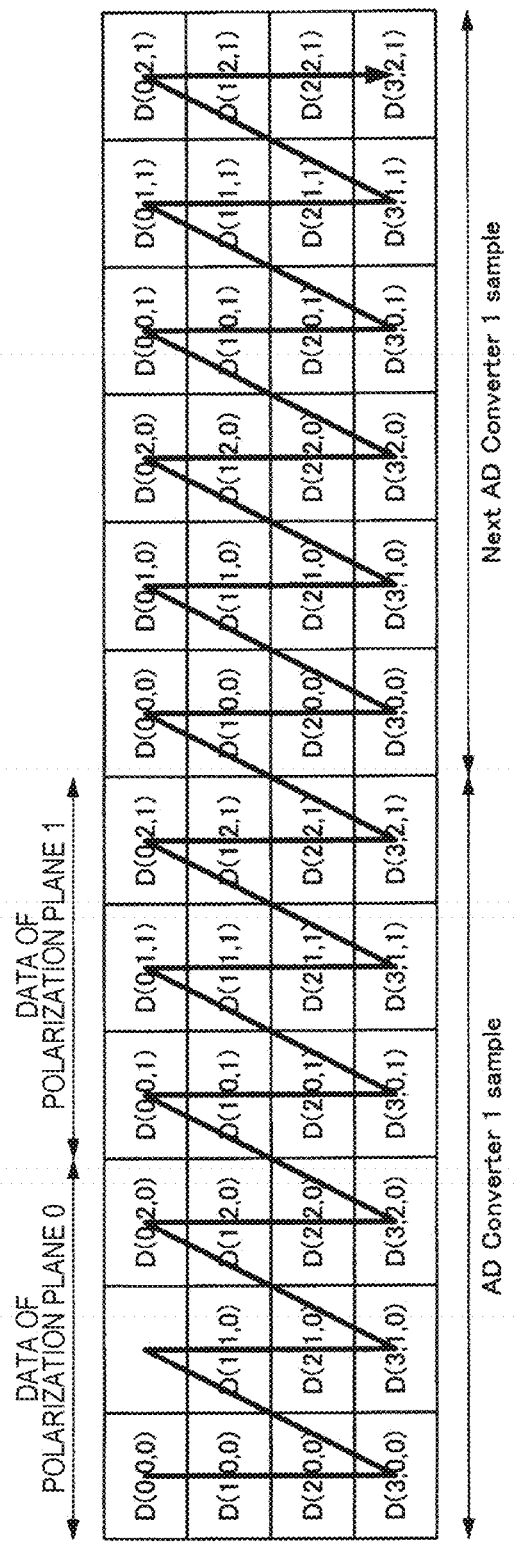
FIG. 11 is an explanatory diagram illustrating an example of an order of transmission in an optical fiber.

FIG. 11 is an explanatory diagram illustrating an example of an order of transmission in an optical fiber in transmitting data from the RRH 100 to the BBU 200. In the optical fiber, in a method called a single core, data is sequentially transmitted. Thus, data is transmitted from the RRH 100 to the BBU 200 via the optical fiber in the order as illustrated in FIG. 11.

Figure 12:
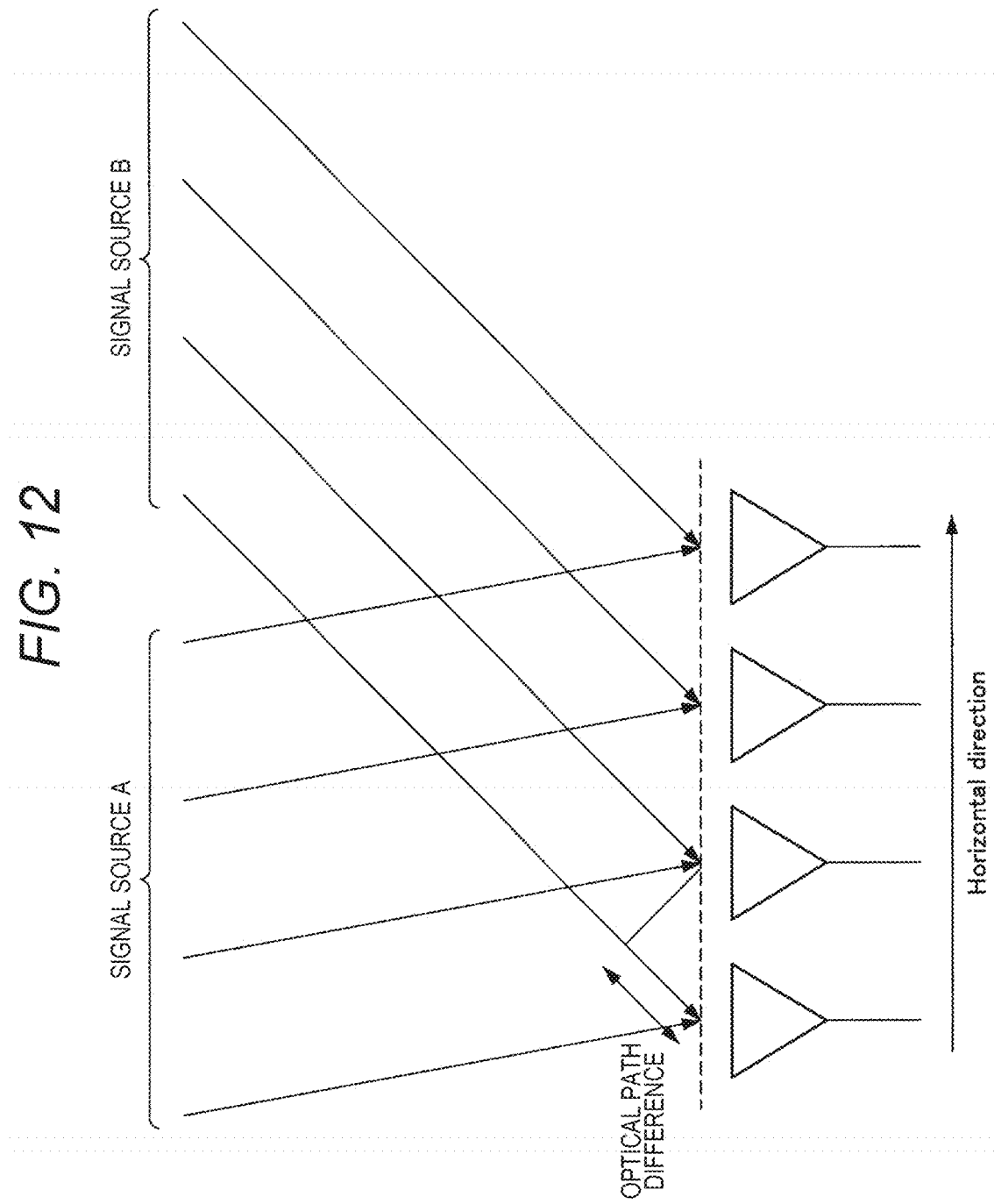
FIG. 12 is an explanatory diagram for describing the meaning of compression of a signal of an array antenna.

The meaning of compression of a signal of an array antenna will be described with reference to FIG. 12. FIG. 12 illustrates a diagram of one-dimensional array antenna for the sake of simplifying description. In a case where two different signals are transmitted and one signal is received by different antennas, a signal that is the same as a signal but different only in a phase difference that is based on an optical path difference length can be received by an array antenna. Thus, in the case of FIG. 12, even if the number of antennas is large, essentially, only two different signals exist, and only two signals exist even though many antennas exist. That is, AD-converted data includes a redundant signal.

Thus, the RRH 100 according to the present embodiment can efficiently compress data keeping the structure of antennas, by applying a compression algorithm. Furthermore, even if signals coming from different directions come to resource blocks with different frequencies, the data compression unit 150 can compress the signals while leaving these signal components.

(3. Generation of I/Q Bit Sequence that Considers Beam Forming)

In the case of implementing beam forming only in the digital domain, beams varying depending on the frequency domain can be prepared. Thus, in the case of implementing beam forming only in the digital domain, different beam directions can be provided at different frequencies.

On the other hand, beam forming implemented in an analogue domain can only use beams to the same direction at the same time even if frequencies are different. Normally, beam forming is implemented only in the digital domain. In other words, as described above, because beam forming is performed in the frequency domain, a beam having different directivity for each frequency can be applied.

However, if this method is applied to the C-RAN, until beam forming processing is applied to AD-converted data, I/Q data needs to be handled by the number of AD converters corresponding to the number of branches (N in the example in FIG. 4). Normally, at the time of reception, beam forming processing is positioned subsequent to fast Fourier transform (FFT).

Figure 13:
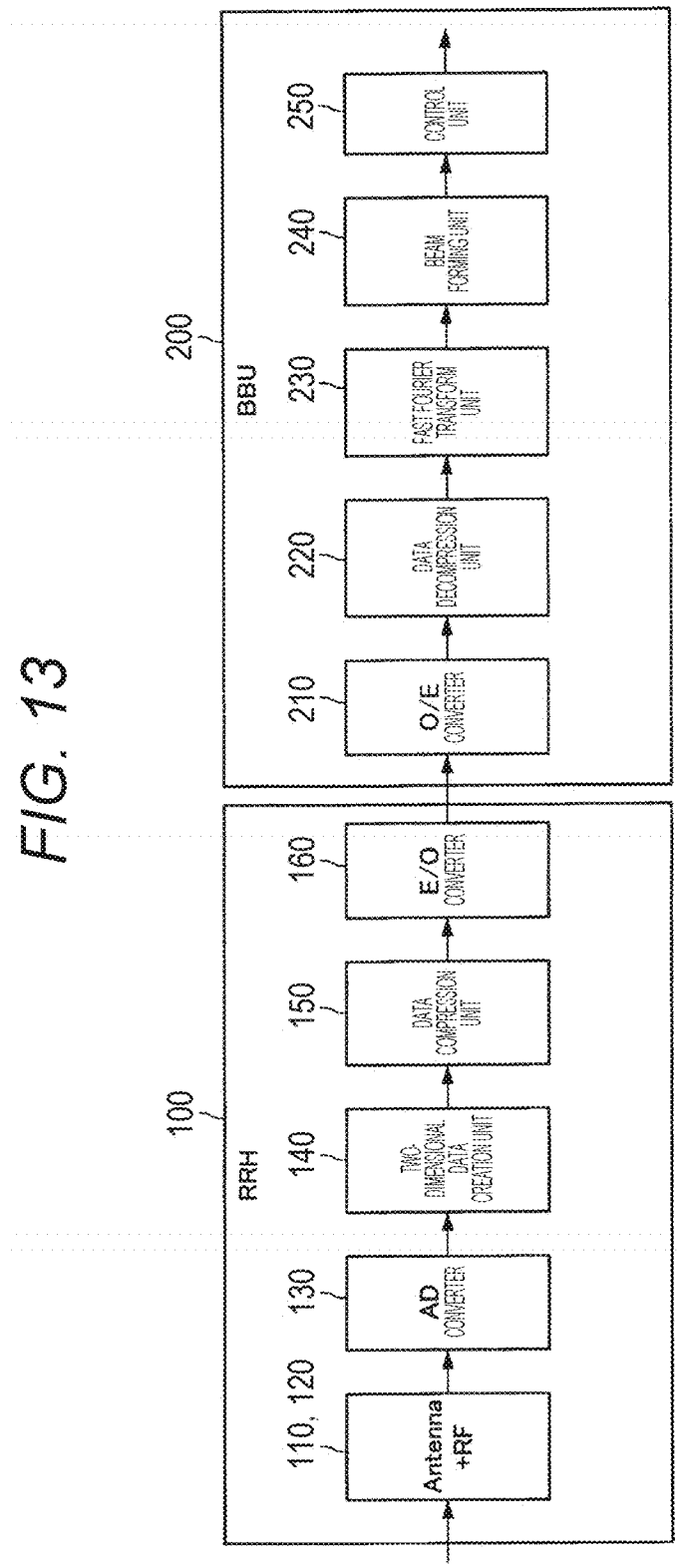
FIG. 13 is an explanatory diagram illustrating a configuration of performing beam forming processing subsequent to fast Fourier transform (FFT) in a BBU.

FIG. 13 is an explanatory diagram illustrating a configuration of performing beam forming processing subsequent to fast Fourier transform (FFT) in a BBU. A BBU 200 illustrated in FIG. 13 includes an O/E converter 210, a data decompression unit 220, a fast Fourier transform unit 230, a beam forming unit 240, and a control unit 250.

The O/E converter 210 converts an optical signal transmitted from the RRH 100 via the optical fiber, into an electrical signal. The data decompression unit 220 decompresses data compressed in the RRH 100 and restores data. The fast Fourier transform unit 230 executes fast Fourier transform processing on the data restored by the data decompression unit 220. The beam forming unit 240 executes beam forming processing on data subjected to fast Fourier transform processing executed by the fast Fourier transform unit 230. The control unit 250 executes basic functions of the BBU 200. Examples of basic functions of the BBU 200 include data decoding, scheduling processing, and QOS control.

Specifically, the beam forming processing executed by the beam forming unit 240 is multiplication processing of antenna weight, and is processing of multiplying received AD-converted data by antenna weight (complex number of I/Q) corresponding to each branch. Thus, the front haul has been required to convey I/Q data by the number of AD converters corresponding to the number of branches.

Thus, in the present embodiment, as beam forming processing for a base station used in a C-RAN, beam forming processing is performed in a time domain, that is to say, before FFT. In a case where beam forming processing is performed in the time domain, beam forming processing (antenna weight multiplication processing) is executed immediately after AD converters existing in the number corresponding to the number of substantive antenna elements. By performing the processing, although it has been necessary to transmit I/Q data by the number of AD converters from the RRH to the BBU, the number of I/Q data transmitted from the RRH to the BBU becomes the number of antenna ports, and an amount of data transmitted from the RRH to the BBU can be reduced.

Figure 14:
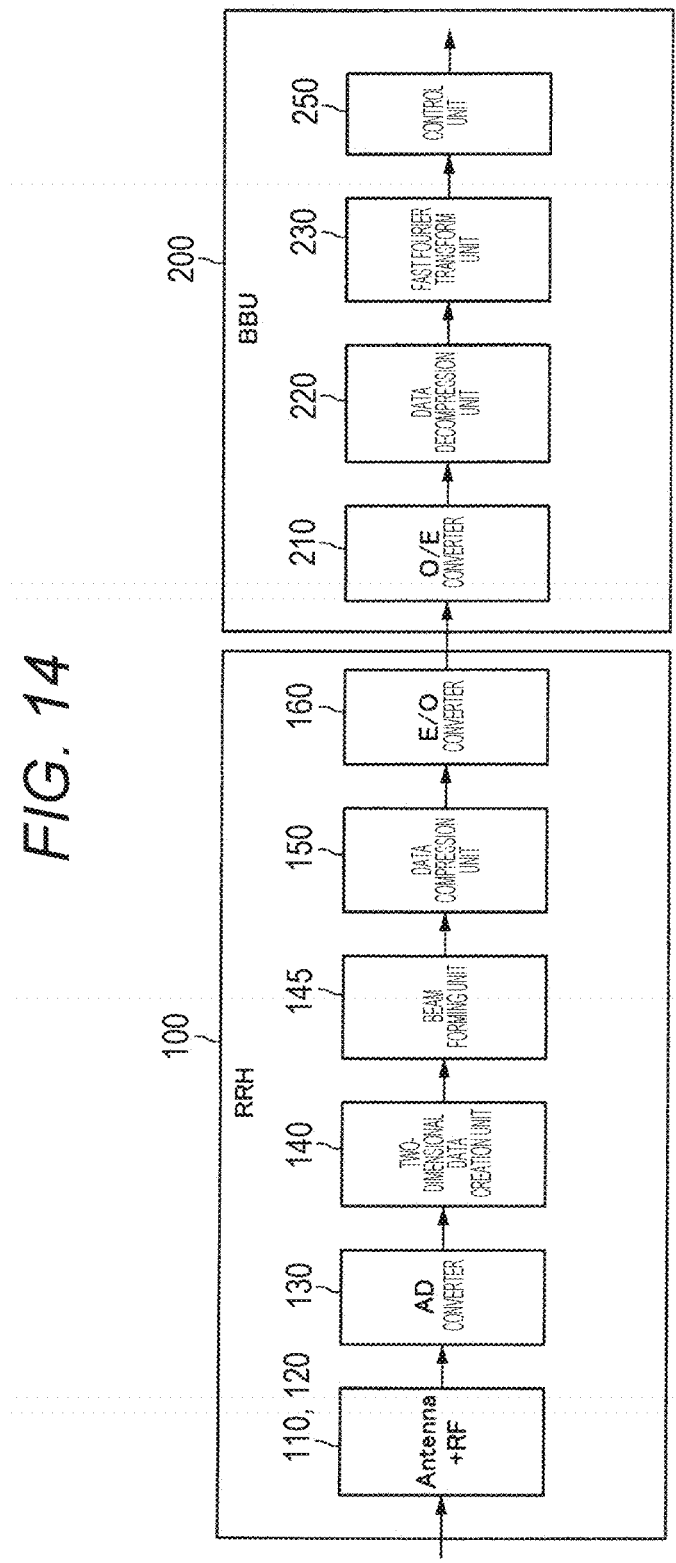
FIG. 14 is an explanatory diagram illustrating a functional configuration example of an RRH 100 and a BBU 200 according to an embodiment of the present disclosure.

FIG. 14 is an explanatory diagram illustrating a functional configuration example of an RRH 100 and a BBU 200 according to an embodiment of the present disclosure. As illustrated in FIG. 14, in an embodiment of the present disclosure, a beam forming unit 145 that performs beam forming processing is provided subsequently to a generation block of an I/Q bit sequence of the RRH 100 and anteriorly to the data compression unit 150.

The RRH 100 according to an embodiment of the present disclosure can reduce an amount of data to be transferred, by performing beam forming processing at this position. For example, even in a case where the RRH 100 includes 200 antennas, when data of MIMO of one layer of one user is taken out, data corresponding to one AD converter is obtained. That is, the RRH 100 according to an embodiment of the present disclosure can reduce a data amount to 1/200 by performing beam forming processing in the time domain.

In a case where this method is employed, different formings cannot be performed at the same time at different frequencies. When this restriction is viewed from an opposite viewpoint, because it is sufficient that multiplexing in the frequency direction is not performed for each user, a base station is only required to be controlled not to perform multiplexing in the frequency direction in scheduling. At this time, the base station preliminarily notifies the terminal that restriction for not performing multiplexing in the frequency direction is imposed, by broadcasting the notification as system information.

Figure 15:
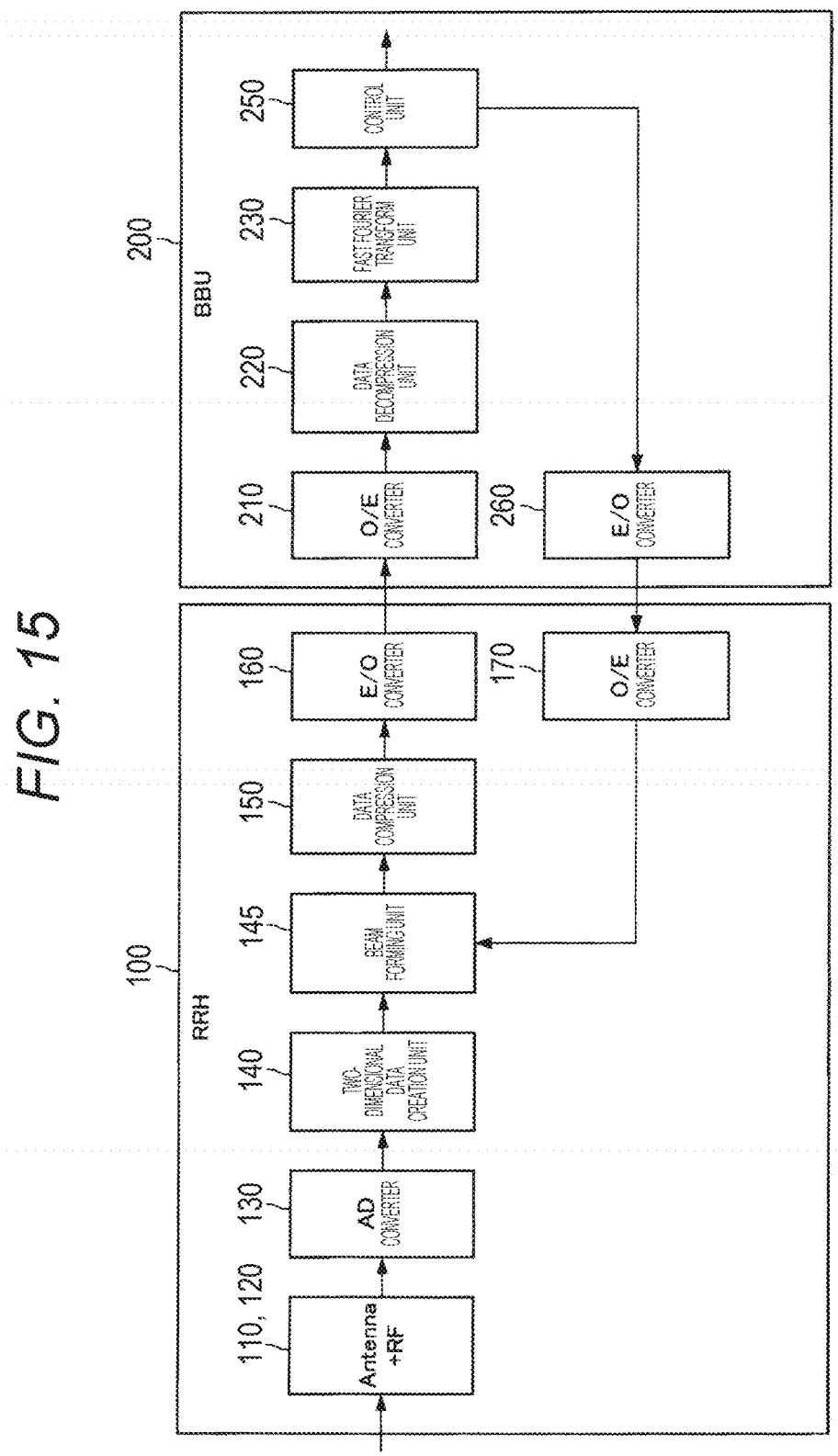
FIG. 15 is an explanatory diagram illustrating a functional configuration example of an RRH 100 and a BBU 200 according to an embodiment of the present disclosure.

An antenna weight coefficient to be used in beam forming processing is notified from the BBU 200 to the RRH 100. This is because the BBU 200 recognizes a direction of beam forming required at each time. Thus, in consideration of the notification of the antenna weight, a block diagram of the RRH 100 and the BBU 200 becomes a block diagram as illustrated in FIG. 15. In FIG. 15, an O/E converter 170 is provided in the RRH 100 and an E/O converter 260 is provided in the BBU 200.

The control unit 250 notifies information regarding an antenna weight coefficient to the RRH 100 via the E/O converter 260. In the RRH 100, information regarding an antenna weight that has been notified from the BBU 200 is transmitted from the O/E converter 170 to the beam forming unit 145. Therefore, the RRH 100 can obtain the information regarding an antenna weight from the BBU 200.

As described above, in a case where there are two different signal sources, a signal essentially changed only in phase on the basis of an optical path difference comes to an antenna of an array antenna. Thus, even if the number of antennas is large, different signals essentially exist only by the number of signal sources. In the generation of an I/Q bit sequence that considers the beam forming, by multiplying a signal output from an antenna, by a weight coefficient of an array antenna, the different signal sources are taken out. Furthermore, the compression algorithm can also compress a signal in the time direction of one signal source.

In the generation method of an I/Q bit sequence that considers beam forming, the description has been given assuming that forming only in one direction is handled in the same sample. Actually, in this method, in the frequency domain of the same sample, beams only in one direction are handled. However, beams in different directions are not disabled in the same sample.

For example, beams in five directions can be simultaneously used in the same sample. One beam at the time is a beam corresponding to the same direction over the entire frequency band. Thus, it becomes possible to handle beams in a plurality of direction.

Figure 16:
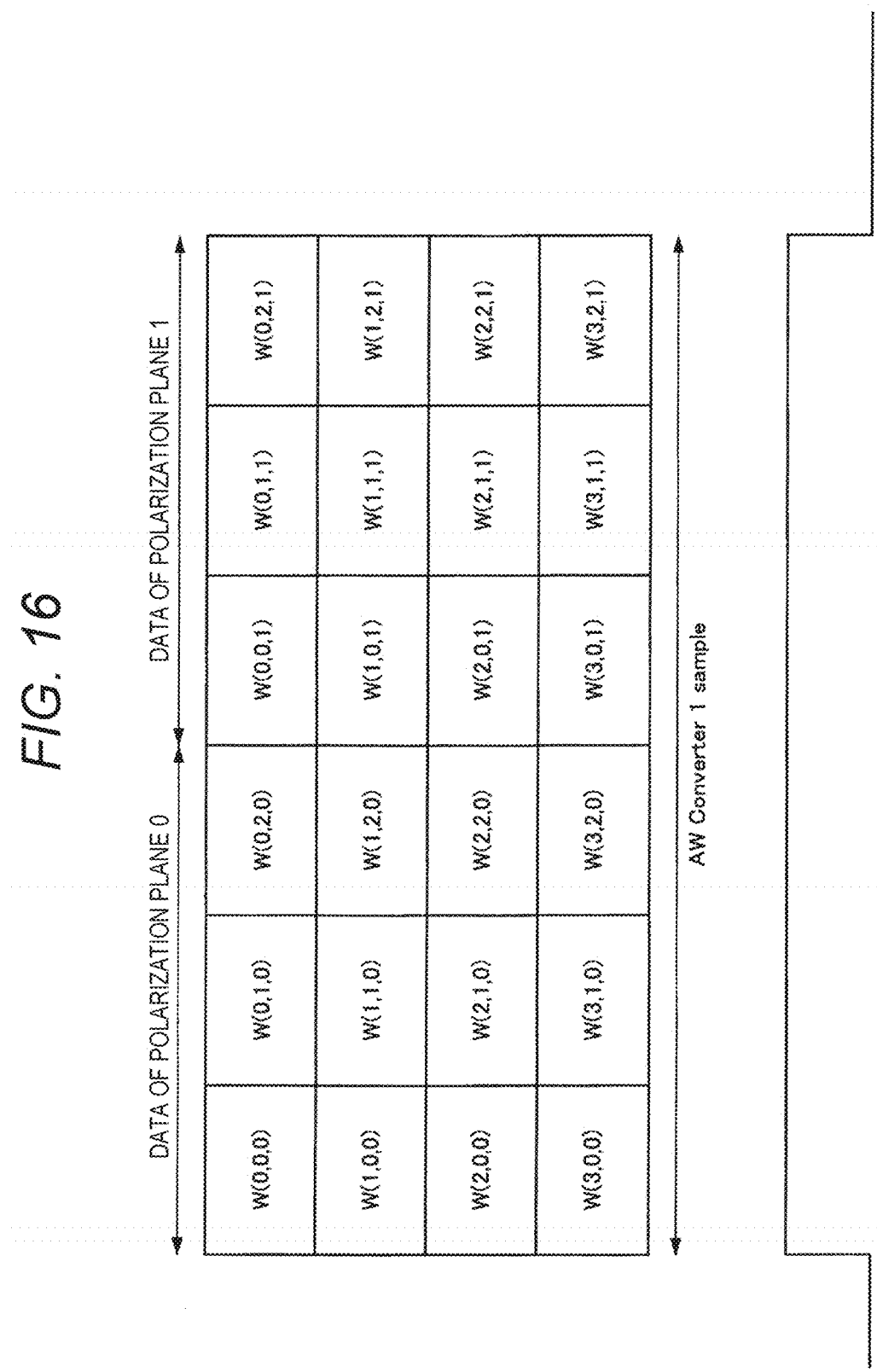
FIG. 16 is an explanatory diagram illustrating a format example of a weighted vector.

FIG. 16 is an explanatory diagram illustrating a format example of a weighted vector used in beam forming processing. A weighted vector does not vary for each sample. If the same beam is considered to be used in at least one resource block, the same weighted vector is used for about several hundreds of samples, for example. Thus, when a valid weighted vector is transmitted from a base station to a terminal, an enable signal is set to 1 as illustrated in FIG. 16.

It has been described that a beam is processed in the time domain (before FFT) in the generation method of an I/Q bit sequence that considers the beam forming. In the case of Hybrid Antenna architecture, as indicated as a use case 9 in Table 4, an antenna configuration in which each of 32 digital circuits is connected to eight analogue phase shifters is obtained. In this use case, beam forming is performed using 32×8=256 antennas in total.

In this case, an analogue phase shifter can adjust only a phase. Eight digital circuits can adjust both an amplitude and a phase. The adjustment by the analogue phase shifter is also performed at the stage of the RRH (in the time domain and before FFT), and a control line for adjusting the phase comes from the BBU. Signals having been roughly subjected to analogue beam processing become eight digital signals. The BBU performs antenna signal processing on the eight digital signal. The present embodiment is characterized in that the phase control of an analogue portion by the phase shifter is controlled from the BBU.

Furthermore, because beams in different directions cannot be created using resources with different frequencies in the beam forming that uses phase shifters, data oriented to the direction of one terminal is processed in a specific time.

(4. Decrease in I/Q Bit Sequence Transmitted from RRH to BBU)

If data is drastically compressed, a data amount becomes small, but data degrades when the compressed data is restored. In the case of an algorithm of compressing data using two-dimensional Fourier transform, for example, the adjustment of a compression rate can be performed by adjusting low-frequency components to be transmitted. The typical example of data degradation includes data in which noise is added to data on an I/Q plane when compressed data is restored.

In a case where the SN of received data is originally bad and a transmitted signal is data of not 256QAM but a low-order modulation scheme like QPSK, the drastic compression of I/Q data often causes no problem. Conventionally, it has been unable to efficiently perform compression because such information indicating a compressible level is not provided.

Even in a case where it is possible to lay an optical fiber that transfers the maximum rate transmitted by an RRH, between the RRH and a BBU, there is a demand for further compression in such a manner as to reduce an amount of data to be transferred. This is because packet loss can occur unless load on a switch is reduced, since many RRHs are connected to a BBU via the switch as illustrated in FIG. 5.

In view of the foregoing, the present embodiment is characterized in that an indicator regarding compression is transmitted from a BBU to an RRH.

Data comes to a base station in a state in which data of a plurality of users is multiplexed. Thus, signals arriving at the same time often include data of a plurality of users. Here, while some users may transmit data using QPSK, the other users may transmit data using 256QAM.

At the stage of AD-converted I/Q data, data of these users are not separated. The data of the users are separated after beam forming processing is performed and FFT is subsequently performed, and data is converted into data in the frequency domain.

Figure 17:
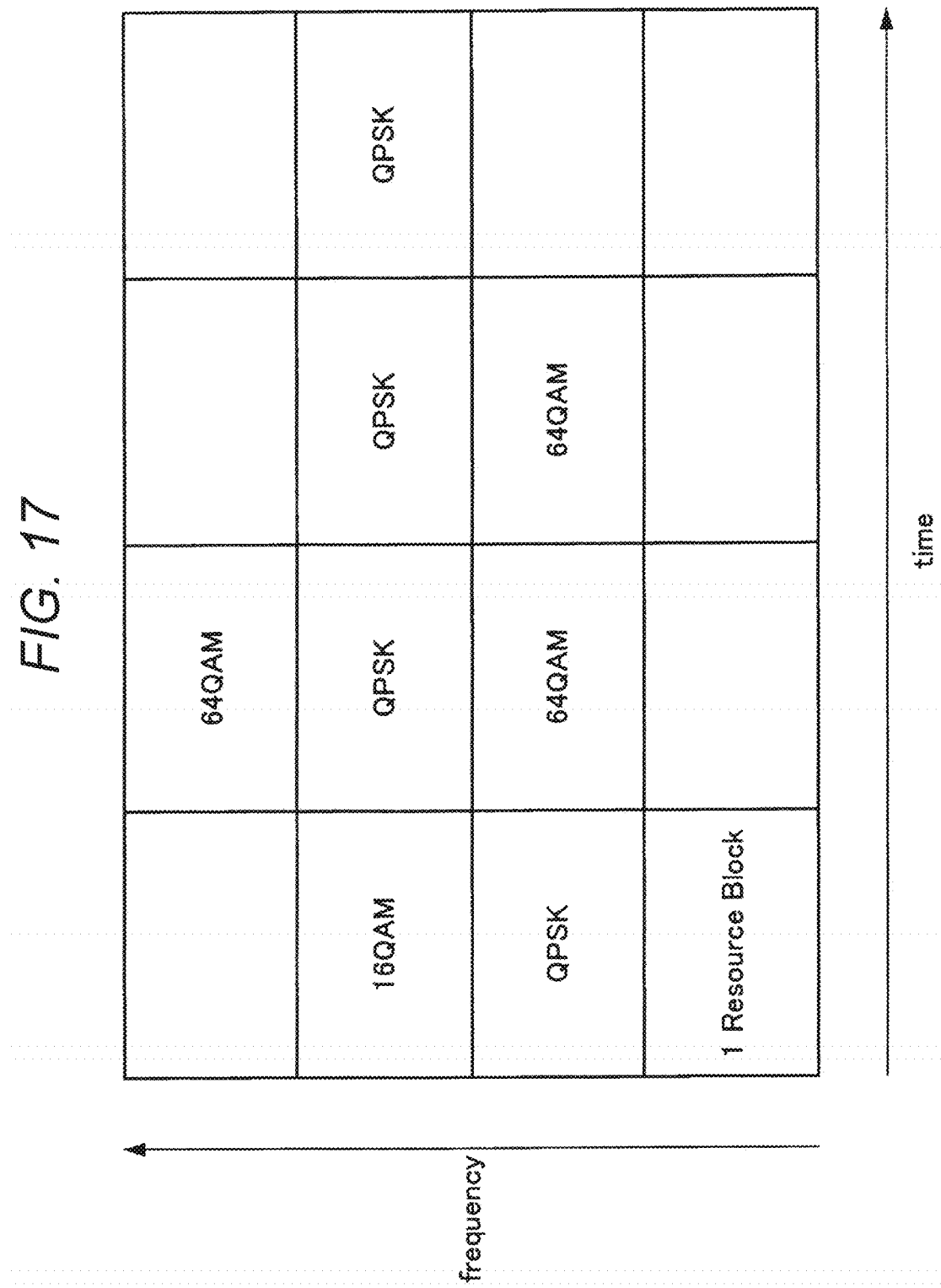
FIG. 17 is an explanatory diagram illustrating a state in which data of a plurality of users is multiplexed.

FIG. 17 is an explanatory diagram illustrating a state in which data of a plurality of users is multiplexed. FIG. 17 illustrates a state in which data with different modulation schemes and encoding rates from a plurality of users is multiplexed in the frequency direction. If a configuration of performing beam forming processing in the BBU is employed, it is necessary to transmit large-volume data from an RRH to a BBU.

Thus, for reducing an amount of data to be transmitted from an RRH to a BBU, data needs to be drastically compressed. However, data in the RRH is I/Q data and the users are not separated at the stage. Thus, it cannot be said that the I/Q data may be drastically compressed as the I/Q data uniformly uses only QPSK.

In view of the foregoing, a scheduler included in Media Access Control (MAC) of the BBU performs scheduling in such a manner as not to allocate different modulation schemes or encoding rates to resource blocks with different frequencies at the same time.

Figure 18:
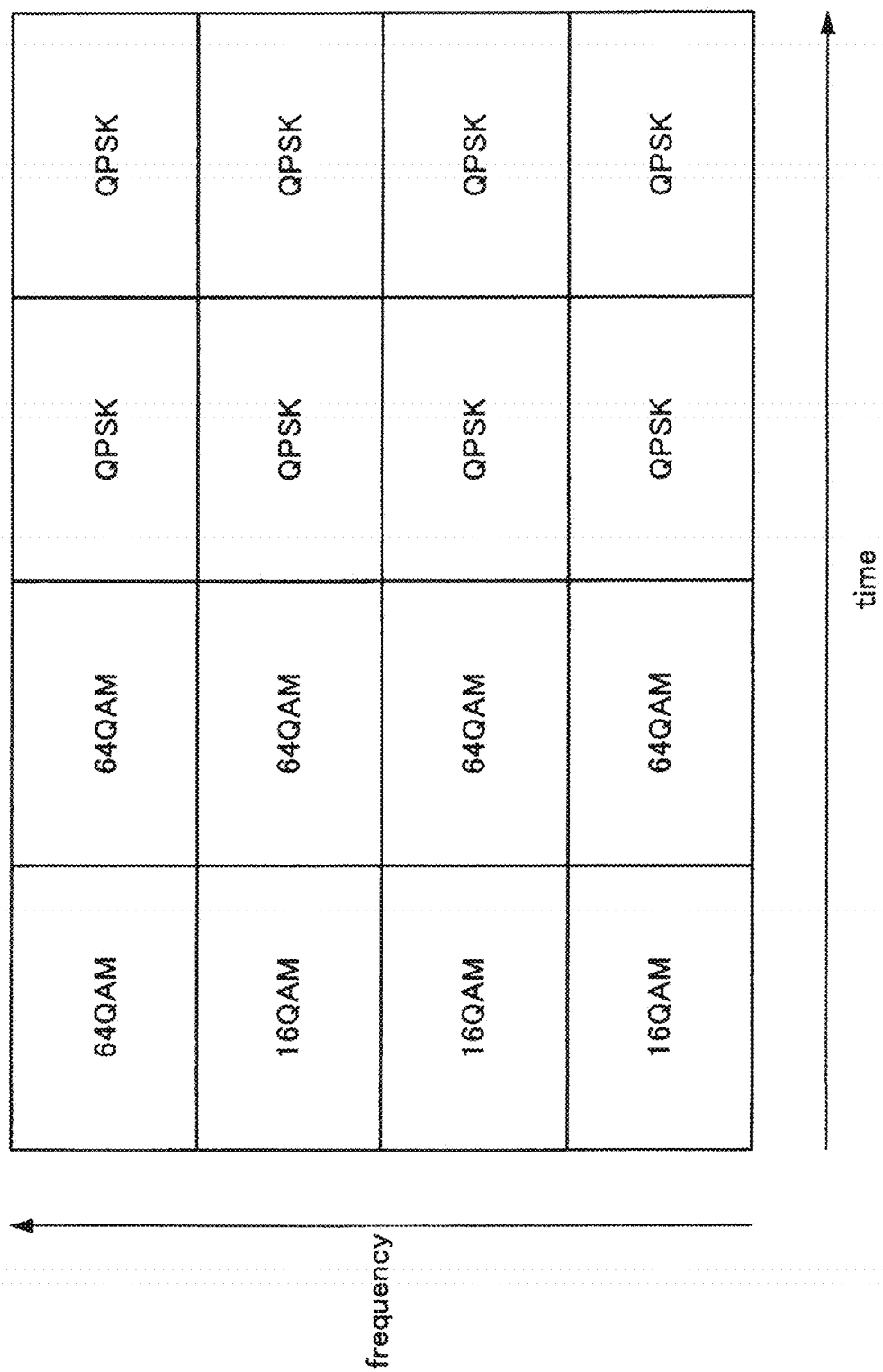
FIG. 18 is an explanatory diagram illustrating a scheduling example.

FIG. 18 is an explanatory diagram illustrating an example in which scheduling is performed in such a manner as not to allocate different modulation schemes or encoding rates to resource blocks with different frequencies at the same time. Then, the BBU notifies information regarding a modulation scheme or an encoding rate of I/Q data corresponding to each resource block, to the RRH.

Figure 19:
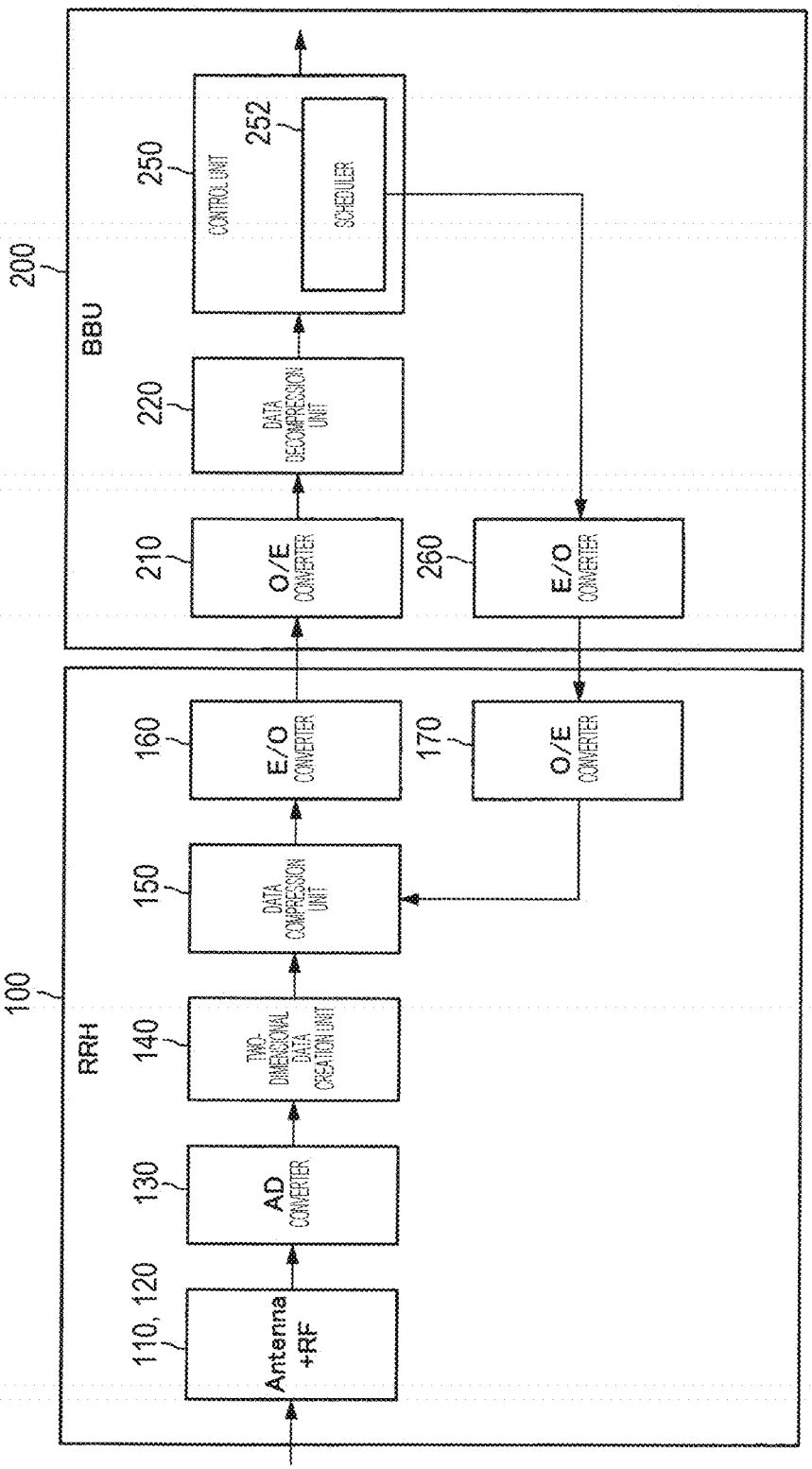
FIG. 19 is an explanatory diagram illustrating a functional configuration example of an RRH 100 and a BBU 200 according to the present embodiment.

FIG. 19 is an explanatory diagram illustrating a functional configuration example of an RRH 100 and a BBU 200 according to the present embodiment. The BBU 200 notifies information regarding a modulation scheme or an encoding rate for an I/Q bit sequence, to the RRH 100 at the granularity corresponding to a resource block. The RRH 100 can optimally perform compression using the information notified from the BBU 200.

A scheduler 252 included in MAC (control unit 250) of the BBU 200 may notify information regarding representative modulation scheme or encoding rate in the resource blocks with different frequencies at the same time, to the RRH 100. Here, the representative modulation scheme or encoding rate may be a modulation scheme or an encoding rate that can transmit data with the largest information amount, for example.

For example, a case where there are a resource block with 64QAM as a modulation scheme and 3/4 as an encoding rate, and a resource block with QPSK as a modulation scheme and 1/2 as an encoding rate will be considered. In this case, an I/Q bit sequence corresponding to the resource blocks at the time includes 64QAM as a modulation scheme and 3/4 as an encoding rate. Thus, the RRH 100 compresses the I/Q bit sequence by selecting a compression rate that does not increase noise too much for the resource block with 64QAM and the encoding rate of 3/4.

Information to be notified from the BBU 200 to the RRH 100 may be an indicator regarding compression including a predetermined bit depth, for example. In the case of defining the compression rate in eight levels from 0 to 7, an indicator regarding compression is formed in three bits. Then, an indicator regarding compression may be notified from the BBU 200 to the RRH 100 as information indicating that 0 corresponds to the highest compression rate and 7 corresponds to the lowest compression rate.

Figure 20:
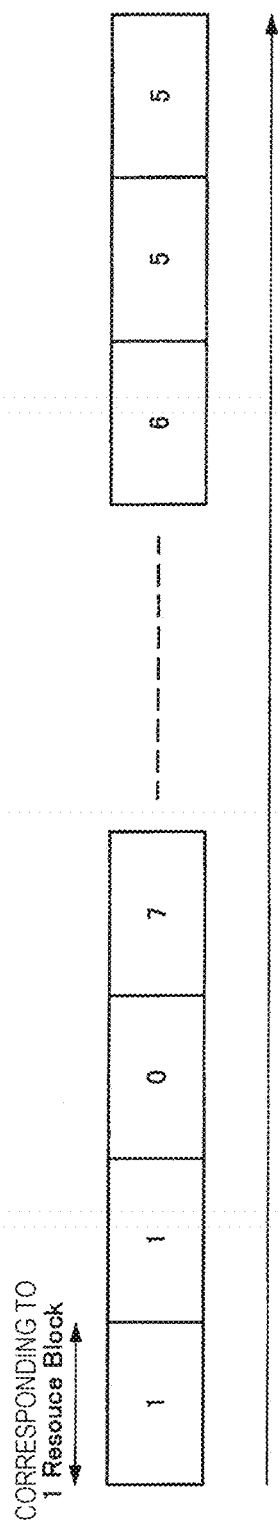
FIG. 20 is an explanatory diagram illustrating an example of information regarding an indicator that is to be notified from the BBU 200 to the RRH 100.

FIG. 20 is an explanatory diagram illustrating an example of information regarding an indicator that is to be notified from the BBU 200 to the RRH 100. The BBU 200 generates information regarding a compression rate for each resource block in this manner, and notifies the notified information to the RRH 100. Using the information regarding the compression rate that has been transmitted from the BBU 200, the RRH 100 executes compression processing on the I/Q bit sequence.

In one base station, data of a plurality of users is sometimes simultaneously multiplexed into resource blocks at the same time and the same frequency, by spacial multiplexing. In this case, the BBU 200 notifies an indicator regarding compression considering not only the modulation scheme or the encoding rate of different resource blocks included in different frequencies at one time, but also a situation in which different users are multiplexed into one resource block by multi-user MIMO (MU-MIMO).

As a result of compressing data in the RRH 100, in a case where an amount of data flowing on a communication path (for example, optical fiber) between the RRH 100 and the BBU 200 increases, and a large amount of data is accumulated in a buffer included in the RRH 100, a buffer status report is transmitted from the RRH 100 to the BBU 200.

In a case where the BBU 200 receives the buffer status report from the RRH 100, and the BBU 200 recognizes that a data amount in the RRH 100 is large, a scheduler in MAC included in the BBU 200 sets a modulation scheme to be allocated to an uplink resource permitted for a terminal, not to 64QAM or the like but to a low modulation scheme like QPSK. Furthermore, the scheduler may perform control such as control of restricting the number of terminals to be subjected to spacial multiplexing by MU-MIMO.

Figure 21:
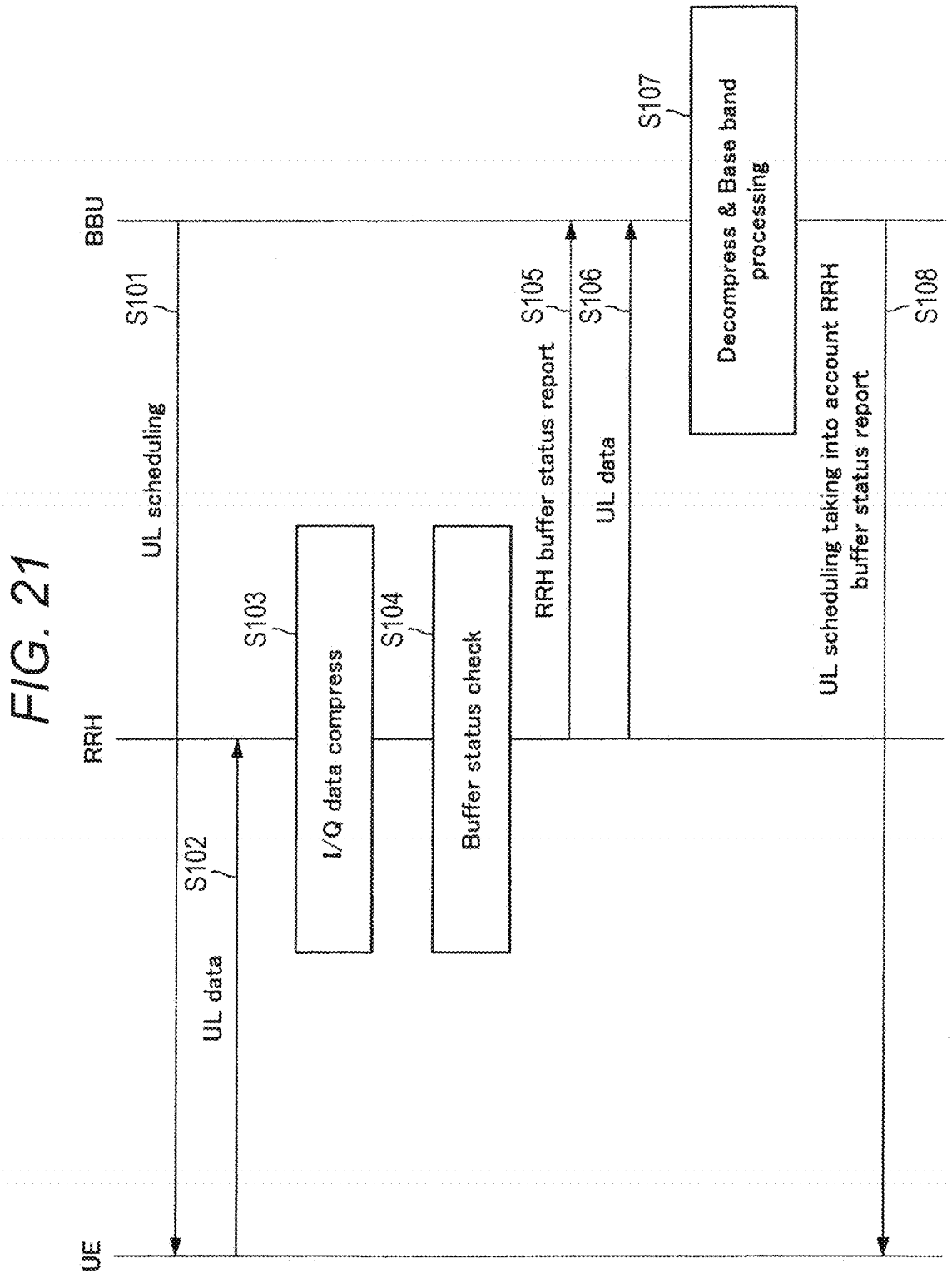
FIG. 21 is a flowchart illustrating an operation example of the RRH 100 and the BBU 200 according to the present embodiment.

FIG. 21 is a flowchart illustrating an operation example of the RRH 100 and the BBU 200 according to the present embodiment. The BBU 200 issues a notification regarding uplink scheduling, to a terminal (Step S101). The terminal transmits uplink data on the basis of the scheduling notified from the BBU 200 (Step S102).

The RRH 100 generates an I/Q bit sequence from the data received from the terminal, and further compresses the generated I/Q bit sequence (Step S103).

When the RRH 100 compresses the I/Q bit sequence, the RRH 100 subsequently checks a buffer status (Step S104), and in a case where a large amount of data is accumulated in the buffer, a buffer status report is transmitted from the RRH 100 to the BBU 200 (Step S105).

Thereafter, the RRH 100 transmits uplink data including the compressed I/Q bit sequence, to the BBU 200 (Step S106).

If the BBU 200 receives the uplink data from the RRH 100, the BBU 200 executes decompression of the received uplink data and base band processing on the decompressed data (Step S107).

Then, if the base band processing on the uplink data is completed, the BBU 200 issues a notification regarding uplink scheduling that takes into account the buffer status report transmitted by the RRH 100 to the BBU 200, to the terminal (Step S108).

A plurality of RRHs always receives data from the terminal. Because a large data amount is required, it is desired to be avoided as far as possible that all pieces of the received data are subjected to AD conversion and a generated I/Q bit sequence is transmitted to the BBU. As illustrated in FIG. 5, data from the plurality of RRH sometimes causes congestion at the switch.

Therefore, an amount of data to be transmitted from an RRH to a BBU is desired to be reduced as far as possible. However, it might be possible to determine that an RRH does not receive data at all, on the basis of the size of the received data of an AD converter, but transmission power of a received signal is sometimes extremely small. For example, this case is a case where data can be received for the first time in UP link repetition of receiving, a plurality of times, data transmitted by a Machine Type Commination (MTC) terminal. Thus, it is difficult to determine the presence or absence of data, only on the basis of the size of received power.

In view of the foregoing, the RRH according to the present embodiment acquires a command for acquiring I/Q, from the BBU only when data is received from the BBU. A scheduler of the BBU notifies such a command to the RRH. For example, in a case where significant data exists, the BBU notifies 1 to the RRH, and in a case where nonsignificant data exists, the BBU notifies 0 to the RRH. Because data itself is transmitted and received as a resource block, actually, the value becomes 1 or 0 at the discontinuity of a resource block.

Figure 22:
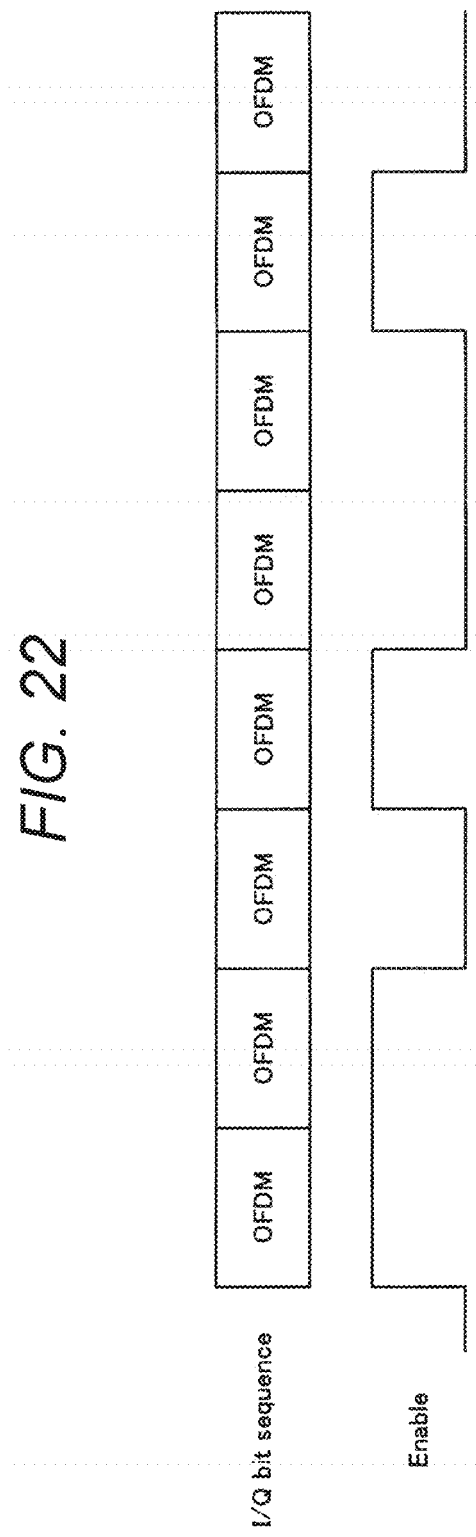
FIG. 22 is an explanatory diagram illustrating an example of data transmitted from a BBU to an RRH.

FIG. 22 is an explanatory diagram illustrating an example of data transmitted from a BBU to an RRH. FIG. 22 illustrates a case where 1OFDM corresponds to a unit in the time direction of a resource block. FIG. 22 illustrates a case where uplink data exists for one OFDM, or uplink data does not exist.

There is a method called Coordinated Multi-Point (CoMP) in which a plurality of RRHs transmits or receives data while cooperatively operating. For example, the method is a technology of enhancing quality of reception in the following manner. Three RRHs illustrated in FIG. 5 cooperatively operate, and the three RRHs simultaneously receive an uplink signal of one terminal and transfer the received signals to the BBU, and the BBU synthesizes the signals from the three RRHs. Here, whether to perform CoMP using two RRHs or to perform CoMP using three RRHs varies depending on the situation. In such a case, transferring I/Q data that can be obtained by all RRHs, to the BBU wastes the resources of the front haul.

In the present embodiment, the resources of the front haul are effectively utilized in the following manner. A case where there is one RRH (called RRH-1) to which UL is allocated by a scheduler, and such scheduling information is not output from other two RRHs (called RRH-2, RRH-3) will be considered. Even in such a case, when CoMP is performed, it is necessary to receive uplink data transmitted from the terminal, by the RRH-2 and the RRH-3 at a timing at which an uplink resource is allocated by the scheduler to the RRH-1.

Thus, the BBU outputs an enable signal indicating whether to transmit I/Q data to the RRH. When the BBU outputs an enable signal, the BBU considers cooperative reception between RRHs to determine whether I/Q data generated from received data is data used in CoMP. FIG. 22 is an explanatory diagram illustrating an example of an enable signal to be output from a BBU to an RRH.

There are uplink resources where an uplink signal might exist or might not exist, in addition to an uplink resource to which an uplink signal from the terminal is certainly received. Table 5 lists uplink resources where an uplink signal might exist.

TABLE 5

(Example of Uplink Resource Where Uplink Signal Might Exist)

| Signal name | Description |
| --- | --- |
| Random access | Procedure for terminal connecting to base station. Resource possibly transmitting uplink signal without permission to resource for Random access. If there is no terminal newly connecting to network, signal does not reach here. |
| Grant free UL data | If uplink signal for which low latency is important is generated in application of terminal, terminal sometimes transmits uplink data without waiting for uplink resource allocation. Nevertheless, uplink resource having such possibility can be designated by base station for terminal. |
| Beam management UL Reference signal | Resource for determining appropriate beam between terminal and base station. Because terminal also performs transmission using beam, if beam of terminal is not oriented to direction of RRH, signal with significant reception level might not reach. |

In this manner, in uplink resources where an uplink signal might be received or might not be received, transferring I/Q data at all times from an RRH to a BBU is very wastefulness.

Because the BBU according to the present embodiment recognizes the locations of resources to which signals come that are listed in Table 5, the location of a resource to which uplink data comes is presented from a BBU to an RRH using an indicator. FIG. 23 is an explanatory diagram illustrating an example of an indicator to be output from a BBU to an RRH.

FIG. 23 also illustrates an enable signal indicating a resource to which uplink data certainly comes FIG. 23 illustrates an uncertain enable signal as an indicator indicating the location of a resource to which uplink data might come. The uncertain enable signal is a signal set to 1 at the locations of resources to which data comes that are listed in Table 5.

In a case where a level of reception is equal to or smaller than a predetermined threshold value in an uplink resource where the uncertain enable signal is set to 1, the RRH can determine not to transfer I/Q data generated by the reception, to the BBU. For implementing the processing in RRH, it is desirable that resources to which uplink data might come and resources to which uplink data certainly comes are not multiplexed in the frequency direction.

However, in a case where resources to which uplink data might come and resources to which uplink data certainly comes are multiplexed at the same time in the frequency direction, for example (FDM multiplexing), the RRH may follow scheduling of resources to which uplink data certainly comes.

FIG. 24 is an explanatory diagram illustrating an example of an indicator to be output from a BBU to an RRH. FIG. 24 illustrates an example of an indicator in a case where resources to which uplink data might come and resources to which uplink data certainly comes are multiplexed at the same time in the frequency direction, for example (FDM multiplexing).

In the example in FIG. 24, an enable signal and an uncertain enable signal become high in the same time. In this case, the RRH executes reception processing in accordance with scheduling of resources to which uplink data certainly comes, that is to say, executes reception processing in accordance with an enable signal.

In short, in the present embodiment, an RRH executes processing for reducing an amount of data to be transmitted to a BBU. As the processing for reducing a data amount, as described above, there are the compression of an I/Q bit sequence and the selection of data to be transferred.

Then, the RRH can acquire various types of information regarding the reduction of a data amount, from the BBU. On the basis of the information acquired from the BBU, the RRH can execute processing for reducing an amount of data to be transmitted to the BBU.

2. Conclusion

By applying the present embodiment, it becomes possible for an operator or a user to arrange low-cost base stations at various locations. Furthermore, by prompting effective utilization of frequency, an operator can provide the user with a service under a stable low-cost wireless communication environment. Then, it becomes possible for the user to receive a service under a stable low-cost wireless communication environment.

Here, the two-dimensional data creation unit 140 in the present embodiment can function as an example of an arrangement unit of the present disclosure. Furthermore, the data compression unit 150 in the present embodiment can function as an example of a compression unit of the present disclosure.

Steps in the processing executed by each device in this specification need not be always processed chronologically along an order described as a sequence chart or a flowchart. For example, steps in the processing executed by each device may be processed in an order different from the order described as a flowchart, or may be concurrently processed.

Furthermore, a computer program for causing hardware such as a CPU, a ROM, and a RAM that is incorporated in each device, to fulfill a function equivalent to the above-described configuration of each apparatus can also be created. Furthermore, storage medium storing the computer program can also be provided. Furthermore, by forming each function block illustrated in the functional block diagram, by hardware, a series or processes can also be implemented by the hardware.

Heretofore, a preferred embodiment of the present disclosure has been described in detail with reference to the attached drawings, but the technical scope of the present disclosure is not limited to this example. It should be appreciated that a person who has general knowledge in the technical field of the present disclosure can conceive various change examples and modified examples within the scope of the technical idea described in the appended claims, and these change examples and modified examples are construed as naturally falling within the technical scope of the present disclosure.

Furthermore, the effects described in this specification are merely provided as explanatory or exemplary effects, and the effects are not limited. That is, the technology according to the present disclosure can bring about another effect obvious for the one skilled in the art, from the description in this specification, in addition to the above-described effects or in place of the above-described effects.

Note that the following configurations also fall within the technical scope of the present disclosure.

(1) A wireless communication apparatus including:
two-dimensionally-arrayed antenna elements; and
an arrangement unit configured to arrange IQ data of signals output from the antenna elements, for each time in a state in which an array of the antenna elements is maintained.

(2) The wireless communication apparatus according to (1) described above, further including a compression unit configured to perform compression processing on two-dimensional IQ data arranged by the arrangement unit.

(3) The wireless communication apparatus according to (2) described above, in which the arrangement unit notifies information regarding a size of a two-dimensional array, to the compression unit.

(4) The wireless communication apparatus according to (2) or (3) described above, in which the compression unit performs compression considering correlation between the antenna elements.

(5) The wireless communication apparatus according to any of (1) to (4) described above,
in which the antenna elements respectively have different polarization planes, and
the arrangement unit separately arranges data from different polarization planes if the data are IQ data at a same time.

(6) The wireless communication apparatus according to any of (1) to (5) described above, in which the arrangement unit arranges IQ data of a signal output from a part of the antenna elements.

(7) The wireless communication apparatus according to (2) described above, further including an output unit configured to output data subjected to compression processing performed by the compression unit, to another apparatus.

(8) The wireless communication apparatus according to (2) described above, further including a beam forming unit configured to execute beam forming processing on two-dimensional IQ data arranged by the arrangement unit, before compression processing is performed by the compression unit.

(9) The wireless communication apparatus according to (8) described above, in which the beam forming unit acquires information regarding a weight coefficient to be used in the beam forming processing, from another apparatus.

(10) The wireless communication apparatus according to (8) or (9) described above, in which the beam forming unit includes a notification unit configured to notify information indicating that only beam forming processing in a same direction is executed in resources at a same time, to an apparatus that performs wireless communication with the wireless communication apparatus.

(11) The wireless communication apparatus according to (10) described above, in which the notification unit notifies the information as system information.

(12) The wireless communication apparatus according to (9) described above, in which the beam forming unit uses information regarding the same weight coefficient over a predetermined sample number.

(13) A wireless communication apparatus including:
two-dimensionally-arrayed antenna element;
a compression unit configured to execute compression processing on IQ data of signals output from the antenna elements; and
a beam forming unit configured to execute beam forming processing on the IQ data before compression processing is performed by the compression unit.

(14) The wireless communication apparatus according to (13) described above, in which the beam forming unit acquires information regarding a weight coefficient to be used in the beam forming processing, from another apparatus.

(15) The wireless communication apparatus according to (13) or (14) described above, in which the beam forming unit includes a notification unit configured to notify information indicating that only beam forming processing in a same direction is executed in resources at a same time, to an apparatus that performs wireless communication with the wireless communication apparatus.

(16) The wireless communication apparatus according to (15) described above, in which the notification unit notifies the information as system information.

(17) The wireless communication apparatus according to (14) described above, in which the beam forming unit uses information regarding the same weight coefficient over a predetermined sample number.

(18) A communication control method including:
acquiring IQ data of signals output from two-dimensionally-arrayed antenna elements; and
arranging the IQ data for each time in a state in which an array of the antenna elements is maintained.

(19) A communication control method including:
acquiring IQ data of signals output from two-dimensionally-arrayed antenna elements;
executing compression processing on the IQ data; and
executing beam forming processing on the IQ data before the compression processing.

REFERENCE SIGNS LIST

100 RRH
200 BBU

The invention claimed is:
1. A wireless communication apparatus comprising:
two-dimensionally-arrayed antenna elements; and
circuitry configured to
arrange IQ data of signals output from the antenna elements, for each time in a state in which an array of the antenna elements is maintained, perform compression processing on the arranged two-dimensional IQ data, and
execute beam forming processing on the arranged two-dimensional IQ data, before compression processing is performed.

2. The wireless communication apparatus according to claim 1, wherein the circuitry performs compression considering correlation between the antenna elements.

3. The wireless communication apparatus according to claim 1,
wherein the antenna elements respectively have different polarization planes, and
the circuitry separately arranges data from different polarization planes if the data are IQ data at a same time.

4. The wireless communication apparatus according to claim 1, wherein the circuitry arranges IQ data of a signal output from a part of the antenna elements.

5. The wireless communication apparatus according to claim 1, wherein the circuitry is further configured to output data subjected to compression processing, to another apparatus.

6. The wireless communication apparatus according to claim 1, wherein the circuitry acquires information regarding a weight coefficient to be used in the beam forming processing, from another apparatus.

7. The wireless communication apparatus according to claim 6, wherein the circuitry uses information regarding the same weight coefficient over a predetermined sample number.

8. The wireless communication apparatus according to claim 1, wherein the circuitry is configured to notify information indicating that only beam forming processing in a same direction is executed in resources at a same time, to an apparatus that performs wireless communication with the wireless communication apparatus.

9. The wireless communication apparatus according to claim 8, wherein the circuitry notifies the information as system information.

10. A wireless communication apparatus comprising:
two-dimensionally-arrayed antenna element; and
circuitry configured to
execute compression processing on IQ data of signals output from the antenna elements, and
execute beam forming processing on the IQ data before compression processing is performed.

11. The wireless communication apparatus according to claim 10, wherein the circuitry acquires information regarding a weight coefficient to be used in the beam forming processing, from another apparatus.

12. The wireless communication apparatus according to claim 11, wherein the circuitry uses information regarding the same weight coefficient over a predetermined sample number.

13. The wireless communication apparatus according to claim 10, wherein the circuitry is configured to notify information indicating that only beam forming processing in a same direction is executed in resources at a same time, to an apparatus that performs wireless communication with the wireless communication apparatus.

14. The wireless communication apparatus according to claim 13, wherein the circuitry notifies the information as system information.

15. A communication control method comprising:
acquiring IQ data of signals output from two-dimensionally-arrayed antenna elements;
arranging the IQ data for each time in a state in which an array of the antenna elements is maintained;
performing compression processing on the arranged two-dimensional IQ data; and
executing beam forming processing on the arranged two-dimensional IQ data, before compression processing is performed.

16. A communication control method comprising:
acquiring IQ data of signals output from two-dimensionally-arrayed antenna elements;
executing compression processing on the IQ data; and
executing beam forming processing on the IQ data before the compression processing.

* * * * *